United States Patent
Hewitt, Jr.

(10) Patent No.: US 11,379,870 B1
(45) Date of Patent: Jul. 5, 2022

(54) GRAPHICAL USER INTERFACE WITH ANALYTICS BASED AUDIENCE CONTROLS

(71) Applicant: Roamina Inc., Cincinnati, OH (US)

(72) Inventor: James F. Hewitt, Jr., Cincinnati, OH (US)

(73) Assignee: Roamina Inc., Cincinnati, OH (US)

( * ) Notice: Subject to any disclaimer, the term of this patent is extended or adjusted under 35 U.S.C. 154(b) by 0 days.

(21) Appl. No.: 17/228,183

(22) Filed: Apr. 12, 2021

Related U.S. Application Data

(60) Provisional application No. 63/020,084, filed on May 5, 2020.

(51) Int. Cl.
*G06Q 30/00* (2012.01)
*G06Q 30/02* (2012.01)
(Continued)

(52) U.S. Cl.
CPC ....... *G06Q 30/0224* (2013.01); *G06F 3/0481* (2013.01); *G06F 3/04847* (2013.01); *G06F 9/451* (2018.02); *G06Q 30/0255* (2013.01)

(58) Field of Classification Search
None
See application file for complete search history.

(56) References Cited

U.S. PATENT DOCUMENTS 6,286,005 B1 * 9/2001 Cannon ............... G06Q 30/0201
  455/2.01
8,676,597 B2 * 3/2014 Buehler ............. G06Q 30/0205
  705/2

(Continued)

FOREIGN PATENT DOCUMENTS

| JP | 2010191963 A | * | 9/2010 | ......... G06Q 30/0247 |
| WO | WO-2071626 A2 | * | 3/2002 | ............. G06Q 30/00 |
| WO | WO-2008042812 A2 | * | 4/2008 | ............. G06Q 30/02 |

OTHER PUBLICATIONS

Jerry W. Thomas. Market Segmentation. (Jan. 18, 2007). Retrieved online Jun. 7, 2021. https://www.decisionanalyst.com/whitepapers/marketsegmentation/ (Year: 2007).*

(Continued)

*Primary Examiner* — James A Reagan
(74) *Attorney, Agent, or Firm* — Frost Brown Todd LLC

(57) ABSTRACT

A graphical interface provides flexible configuration of campaigns with real-time visualization and click and drag operation. A user may filter input data describing their customer base and select analytical components upon which the campaign should analyze customers in order to produce a normalized line representing the potential campaign audience. The user may add breakpoints to the chart view in order to define reward segments, and associate offers with each reward segment. Creation of reward segments and assignment of offers may be performed with simple click operations, click and drag operations, or other interactions with the graphical interface. Reward segments may be vertical, horizontal, curve-based, or may be other shapes or arbitrarily drawn regions. A campaign defined by the GUI may be output by the system as a campaign dataset in various formats, with each format being usable to execute the associated campaign by identifying qualifying recipients and delivering corresponding offers.

20 Claims, 16 Drawing Sheets

(51) Int. Cl.
*G06F 9/451* (2018.01)
*G06F 3/04847* (2022.01)
*G06F 3/0481* (2022.01)

(56) References Cited

U.S. PATENT DOCUMENTS

| | | | | |
|---|---|---|---|---|
| 8,731,966 | B2* | 5/2014 | Breitenstein | G16H 10/60 705/2 |
| 9,392,310 | B2* | 7/2016 | Volovich | H04N 21/254 |
| 9,432,714 | B2* | 8/2016 | Kitts | H04N 21/4532 |
| 9,521,960 | B2* | 12/2016 | Lee | G06Q 30/0201 |
| 10,380,650 | B2* | 8/2019 | Hamedi | G06Q 30/0271 |
| 10,587,916 | B2* | 3/2020 | Tsivin | G06Q 30/0202 |
| 2003/0220860 | A1* | 11/2003 | Heytens | G06Q 40/00 705/7.29 |
| 2008/0120129 | A1* | 5/2008 | Seubert | G06Q 40/125 705/305 |
| 2008/0319829 | A1* | 12/2008 | Hunt | G06Q 30/0201 705/7.29 |
| 2009/0006156 | A1* | 1/2009 | Hunt | G06Q 30/02 705/7.11 |
| 2009/0018996 | A1* | 1/2009 | Hunt | G06Q 30/02 |
| 2009/0030780 | A1* | 1/2009 | York | G06Q 30/02 705/7.29 |
| 2011/0251875 | A1* | 10/2011 | Cosman | G06Q 30/0264 705/7.31 |
| 2011/0258049 | A1* | 10/2011 | Ramer | G06Q 30/0273 705/14.69 |
| 2012/0069131 | A1* | 3/2012 | Abelow | G06Q 10/067 348/14.01 |
| 2012/0155778 | A1* | 6/2012 | Buchmueller | G06F 16/583 382/209 |
| 2013/0205339 | A1* | 8/2013 | Haberman | H04N 21/4508 725/35 |
| 2014/0058826 | A1* | 2/2014 | Ogawa | G06Q 30/02 705/14.43 |
| 2015/0235258 | A1* | 8/2015 | Shah | G06Q 30/0242 705/14.45 |
| 2016/0086108 | A1* | 3/2016 | Abelow | G06Q 10/10 705/7.29 |
| 2016/0364770 | A1* | 12/2016 | Denton | G06F 16/248 |
| 2016/0379243 | A1* | 12/2016 | Kalish | G06Q 30/0242 705/14.41 |
| 2017/0236407 | A1* | 8/2017 | Rhoads | G06F 16/29 455/420 |
| 2019/0034976 | A1* | 1/2019 | Hamedi | G06Q 30/0204 |
| 2019/0104343 | A1* | 4/2019 | Tsivin | H04N 21/44213 |
| 2019/0303807 | A1* | 10/2019 | Gueye | G01C 21/3679 |
| 2020/0027137 | A1* | 1/2020 | Miller | G06Q 30/0277 |
| 2020/0265449 | A1* | 8/2020 | Sundararaj | G06Q 30/0276 |
| 2020/0402099 | A1* | 12/2020 | Pittman | G06Q 30/0269 |

OTHER PUBLICATIONS

McKinsey Analytics. "Analytics Comes of Age." (Jan. 2018). Retrieved online Apr. 25, 2022. https://www.mckinsey.com/~/media/McKinsey/Business%20Functions/McKinsey%20Analytics/Our%20Insights/Analytics%20comes%20of%20age/Analytics-comes-of-age.ashx (Year: 2018).*

Irving Fisher Committee on Central Bank Statistics. "IFC Bulletin No. 50 The use of big data analytics and artificial intelligence in central banking." (2019). Retrieved online Apr. 25, 2022. https://www.bis.org/ifc/publ/ifcb50.pdf (Year: 2019).*

* cited by examiner

GRAPHICAL USER INTERFACE WITH ANALYTICS BASED AUDIENCE CONTROLS

CROSS REFERENCE TO RELATED APPLICATIONS

This is a non-provisional of, and claims the benefit of, U.S. provisional patent application 63/020,084, filed on May 5, 2020, which application is incorporated by reference in its entirety.

FIELD

The disclosed technology pertains to a system and interface for analytics-based controls.

BACKGROUND

Segmentation, such could be used in security analysis and risk mitigation of remote resources, is a challenging activity and in many cases can be a manual process performed by a specialized analyst. Such analysts may not be technically trained to write code or advanced mathematical formulas. The analyst will often model a segment in a customized spreadsheet or use a customized form-based input to key the details into a system that would perform some kind of actions based on the segmentation. While spreadsheets and form inputs may be used by a user with minimal training, they must first be created (e.g., which may require advanced spreadsheet techniques or software development skills) and, once created, provide a static set of options for that may not provide the desired level of flexibility.

Additionally, such approaches often only allow one set of attributions to be configured at a time. For example, if one would like to create an initiative that performs different actions for different target segments, this would generally be configured one segment at a time, with each segment being manually opened, modified, and saved, which may require navigation through multiple spreadsheet files, web pages, or other interfaces in order to create the five required entries. This repetitive process is error prone, and may result in redundant activities, failure to implement required actions, lost data between web form submissions and page loads, and other user or technical errors.

What is needed, therefore, is an improved system for defining and using segments.

BRIEF DESCRIPTION OF THE DRAWINGS

The drawings and detailed description that follow are intended to be merely illustrative and are not intended to limit the scope of the invention as contemplated by the inventor.

DETAILED DESCRIPTION

Figure 1A:
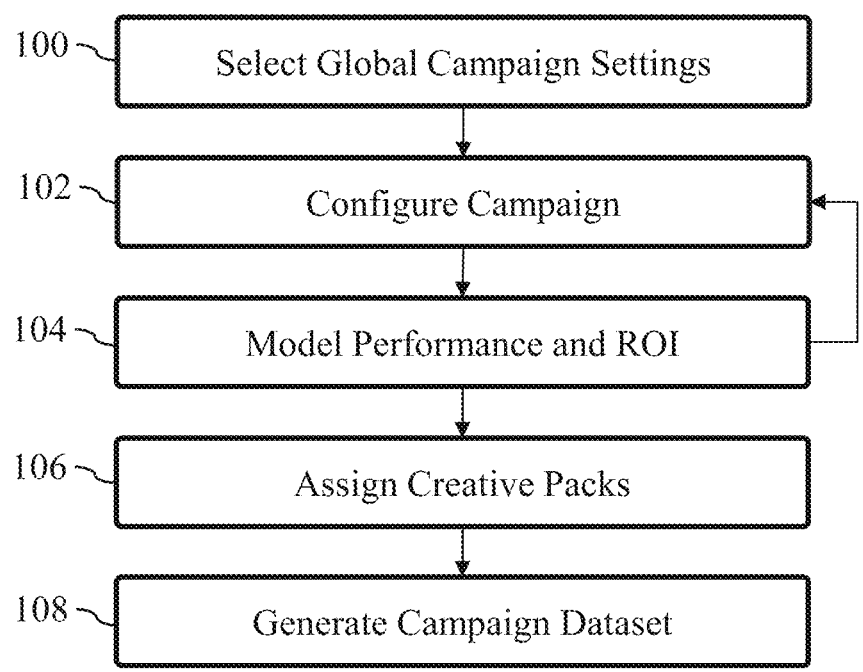
FIG. 1A is a high-level flowchart of a set of steps that may be performed to provide an interface for managing audience interactions.

The inventor has conceived of novel technology that, for the purpose of illustration, is disclosed herein as applied in various contexts, such as information security, education, healthcare and customer relationship management. While the disclosed applications of the inventor's technology satisfy a long-felt but unmet need in the art of customer relationship management, it should be understood that the inventor's technology is not limited to being implemented in the precise manners set forth herein, but could be implemented in other manners without undue experimentation by those of ordinary skill in the art in light of this disclosure. Accordingly, the examples set forth herein should be understood as being illustrative only, and should not be treated as limiting.

A system, method and interface are disclosed herein that provide users with one or more features associated with configuring audience interactions using a graphical user interface (GUI). The user can generate a simple audience interaction or an advanced audience interaction with multiple profile elements and actions groupings using one interface without switching between spreadsheets, website locations, or other interfaces. Use of the disclosed features provides a high level of flexibility in configuration and control of audience interactions, but does not require a user to have advanced analytics training or software development skills. In some implementations, the user can model the audience interaction and results based upon dynamic interfaces that are generated and updated in real time, and adjust accordingly. Once the user is satisfied with the audience interaction configuration, the user may output the specification in varying formats, which may generate software code or data files usable to execute the audience interaction, may generate creative content to be paired with the audience interaction, or both.

Some implementations of the disclosed system allow a user to select one or more analytical profile models and visually see the profiles displayed on a line chart. For example, where an implementation provides audience interactions that allow a business to send communication to customers (e.g., a "marketing campaign" or just a "campaign"), an analyst may want to create a campaign for a company using the last day of purchase. The customer population would be plotted on a chart with # of Customers on the Y-axis and Days Since Last Purchase on the X-axis based on analytics data associated with the company. The chart would generate a normalized distribution curve. When creating the chart, the analytical component data associated with the company may be retrieved and plotted on the chart. The query may pull only a relevant sample size from the database, and it may not be necessary to retrieve all the records. Once the data is plotted, a normalized curve may be rendered against the data. Additional components may be similarly rendered, with resulting lines being visually distinct or positioned on additional layers of the chart.

While campaigns as described are one potential implementation and use of the disclosed system, other implementations and uses exist. Embodiments of the disclosed technology may provide a graphical user interface that allows a user to create complex audience segmentations using simple interfaces, and then associate actions with individual segments that will be triggered for individuals present within that segment (e.g., either on a set schedule for every individual in that segment, or on a per-individual basis as individuals enter that segment).

Based on the above, other applications for such a GUI will be apparent to those of ordinary skill in the art. As an example, consider an elderly care setting where a variety of elderly residents are being cared for. A care provider may use the disclosed GUI to identify segments (e.g., subsets) of residents exhibiting certain characteristics, and may associate an action to be triggered for those residents. To further the example, the care provider may have a limited number of volunteers that will visit and provide companionship to residents each day. To identify residents that would most benefit from such a visit, the care provider may use the disclosed GUI to identify an audience or population segment of the residents who: (i) have been at the care facility for less than six months, (ii) have not received a visitor of any type for more than two weeks, and (iii) have moderate or high scores in evaluations of social interactions with facility staff. After identifying the segments, the GUI may automatically schedule volunteers to visit members of the audience within the desired segment (e.g., by automatically distributing electronic communications to volunteers, facility staff, and affected residents, generating name tags and visitor passes for volunteers, or other actions).

The above example can be advantageously applied in other settings as well. As an example, consider a scholastic setting where a teacher or tutor would like to identify a segment of a class or student body that would most benefit from individualized tutoring sessions, or invitations to access and use specialized educational software (e.g., an automated invitation to download a mathematics application to a smartphone or tablet, and an automated request for a license or subscription to use the application).

Information security, especially as associated with a remote workforce, is yet another area where the disclosed technology may be advantageously applied. For example, analytic components such as location and technology used by remote workers could be used to identify particular high risk segments, and actions (e.g., providing additional antivirus technology or malware protection) could then be associated with those segments to mitigate those risks. Other applications in other context are also possible, and so the above examples, as well as the description of how aspects of the disclosed technology could be applied in the context of customer relationship management should be understood as being illustrative only, and should not be treated as limiting.

Figure 1B:
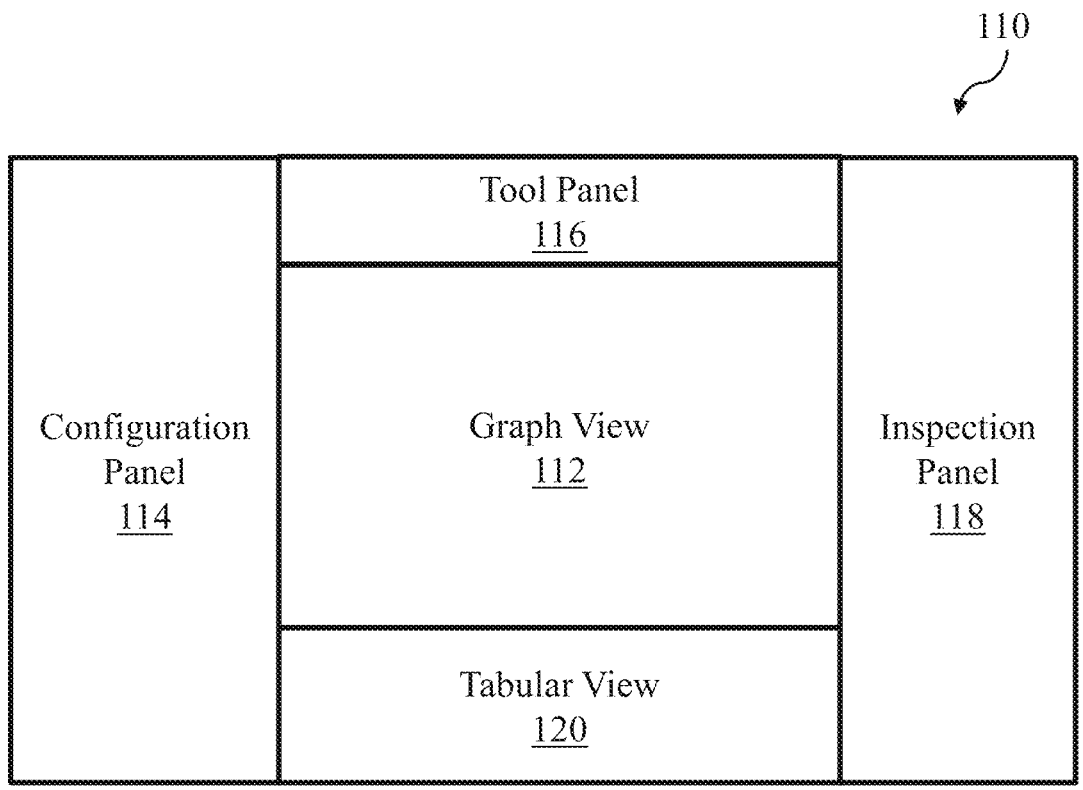
FIG. 1B is a schematic diagram of an interface corresponding to the flowchart of FIG. 1A.
Figure 1C:
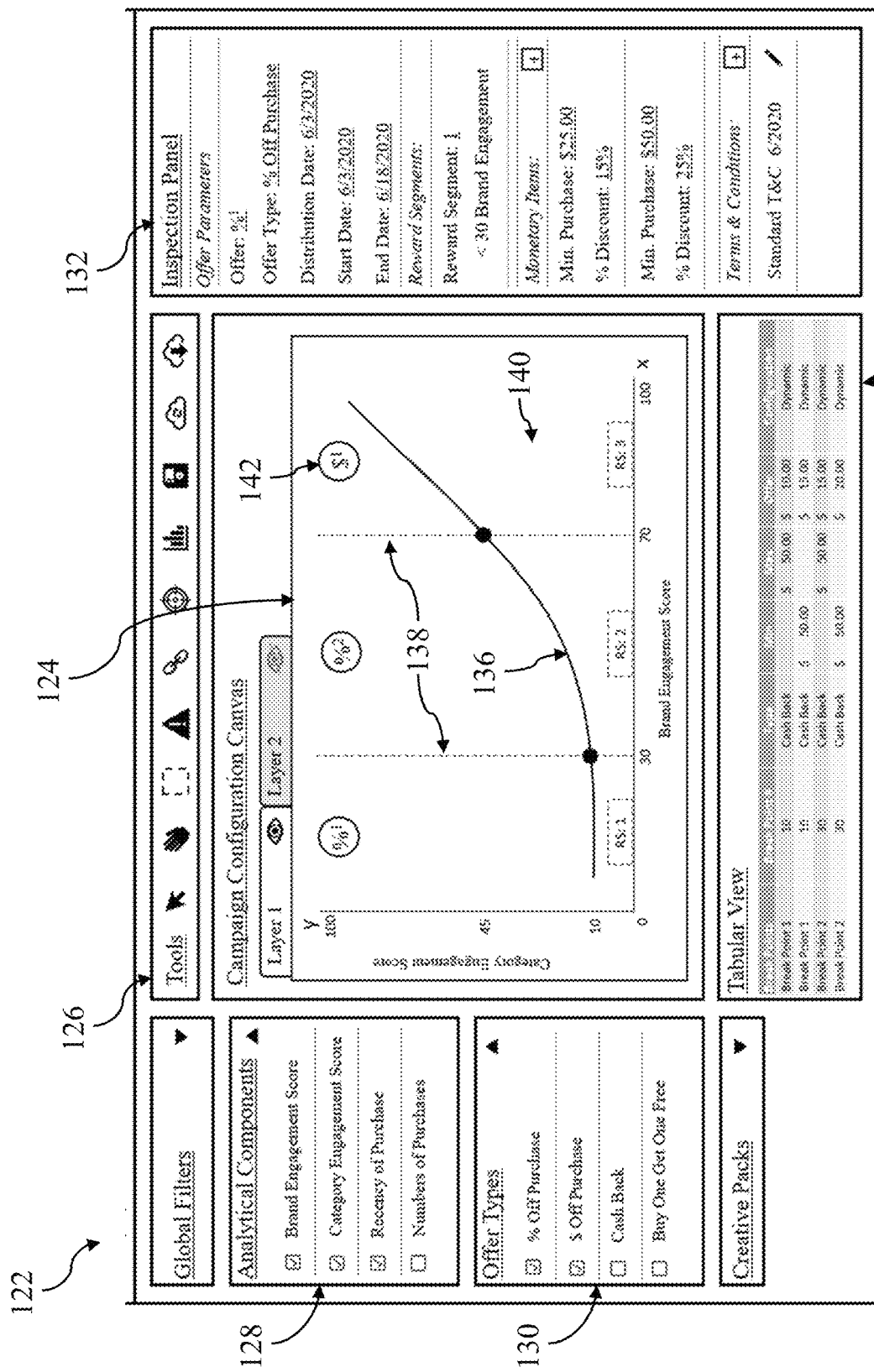
FIG. 1C is an illustration of an interface corresponding to the flowchart of FIG. 1A.

Turning now to the figures, FIG. 1A is a high-level flowchart of a set of steps that may be performed to provide an interface for managing audience interactions, while FIGS. 1B and 1C each show examples of such an interface. When referred to herein, an audience interaction may describe processes, data, information, and/or software objects that are associated with identifying one or more subsets or segments of individuals within a greater population or audience and then taking or triggering some action such as executing a strategy, achieving a goal, or taking other steps related to the one or more segments of individuals (e.g., customers, users, social media followers, employees, patients, students, remote workers). Examples of audience interactions may include user management campaigns directed at providing discount coupons or special sales to customers that have previously purchased from a business, providing a gift to social media followers that have frequently shared posts, providing other benefits to frequent users of a software platform or website, providing particular services to patients or students that would most benefit from those services, performing mitigation measures for high risk portions of a remote workforce and other examples.

The steps in FIG. 1A include selecting (100) global audience interaction settings, configuring (102) an audience interaction, modeling (104) performance for the audience interaction, potentially reconfiguring (102) the audience interaction based upon modeled (104) performance, assigning (106) creative content to the audience interaction, and generating (108) an audience interaction dataset that is usable to implement and execute the audience interaction.

FIG. 1B shows a schematic diagram of an interface (110) such as that provided and used during the steps of FIG. 1A. The interface (110) may be shown via a display of a user device such as a computer, smartphone, or tablet, and may be provided via a software application (e.g., a mobile application, a desktop application), a web interface (e.g., a web browser, a hybrid application), or another software interface. The interface (110) shown includes a chart view (112) configured to display interactive visual information related to an audience interaction that is being configured.

A configuration panel (114) may include one or more interactive elements (e.g., buttons, selection menus, radio buttons, text input boxes, draggable sliders) that allow a user to configure aspects of the audience interaction and/or interact with the chart view (112).

A tool panel (116) may provide one or more selectable tools that a user may interact with in order to configure aspects of the audience interaction and/or interact with the chart view (112).

An inspection panel (118) may provide more detailed information relating to the chart view (112) and the configured audience interaction and may be updated in real time to reflect configurations (e.g., when a particular benefit is added to a portion of the chart view, the inspection panel (118) may provide text information describing that benefit that may be altered to modify the benefit).

A tabular view (120) may provide more detailed information relating to the chart view (112) and configured audience interaction, and may provide information similar to that offered by the inspection panel (118) but in differing formats. As an example, the tabular view (120) may display and allow users to interact with audience interaction configurations in a more complex format, such as columns and rows of information that may conventionally be defined in spreadsheets related to audience interaction configurations.

FIG. 1C shows an interface (122) that includes many of the features described in relation to the interface (110) in an implementation usable to manage customer marketing or outreach campaigns. As has been described, a campaign is only one exemplary implementation of the disclosed technology, and other variations and implementations exist. As such, while the following figures, examples, and descriptions may discuss audience interactions in the context of customer marketing and marketing campaigns for the sake of clarity, it should be understood that such descriptions may be broadly applied in other contexts (e.g., student management, patient care, information security, etc.). A chart view (124) may show data relating to the campaign in varying visual formats (e.g., a line or curve graph, bars, charts, or other data driven visual format). The curve (136) shown in the chart view (124) has been overlaid by break points (138) that divide the curve into different reward segments, such as a reward segment (140) labeled RS:3. Customers whose interactions with the campaign creator fall within certain reward segments may be awarded an offer (142) (e.g., a percent discount, cash back coupon, buy one get one free) associated with that reward segment while the campaign is in effect.

As an example using the chart view (124) of FIG. 1C, a customer may have a brand engagement score (e.g., a score, value, or rating determined by measurable actions by the customer that interact with a particular brand such as "Ace Clothing Stores", which may include, for example, purchases, website visits, store visits, survey responses) that exceeds a value indicating high engagement with the brand (e.g., greater than 70, on a scale of 100). The customer may also have a category engagement score (e.g., a score, value, or rating determined by measurable actions by the customer that interact with a particular category of services or goods across one or more brands such as "clothing", which may include, for example, purchases, website visits, store visits, or other actions which show an interest in clothing) that exceeds a value indicating high engagement with a category of goods. When the campaign shown in the chart view (124) is implemented, the customer described above would qualify for the configured offer (142) associated with the reward segment (140), which may result in the system automatically transmitting an email or text message including a code or other information that may be redeemed for a cash credit or discount on future purchases.

A set of tools (126) includes various interactive tools that may be used to interact with the chart view (124) and configure various aspects of the campaign. An example of a tool is a grouping tool allows two or more reward segments to be joined so that the system treats them identically for purposes of offers and other characteristics. Another tool may include an unassigned segment tool that visually highlights or selects any reward segments (140) defined for the campaign that have not been associated with an offer (142). This may be useful for complex campaigns that include additional lines or curves, as will be shown in more detail below, or that otherwise include a large number of reward segments, or reward segments that are small or shaped in such a way that they may not be visually obvious in the chart view (124).

Another tool may include a select pointer tool that allows the user to select items on the pages and interact with them, which may include selecting and moving break points (138), selecting and moving offers (142), or panning, moving, scaling, or otherwise modifying the perspective of the chart view (124). Another tool may include a breakpoint plotting tool that is used to create and place break points (138) on the chart view (124) in order to define new reward segments (140). Break points (138) may be placed as lines, as shown in FIG. 1C, but may also be defined in other ways (e.g., squares, triangles, circles, or other shapes, as well as arbitrarily drawn shapes). In such cases a marquee tool may be used to make selections on the chart view (124) to define a reward segment. This tool can be set to snap to the charting line and or to other reward segments.

Another tool may include a model tool that generates a forecast of the results of the campaign based upon user defined assumptions (e.g., 50% of customers utilize the offer and spend $50 or more in the same transaction), based upon customer analytics available to the system (e.g., such as user purchase and response habits based upon the same underlying metrics as used to generate the brand and category engagement scores), or both. Other exemplary tools may include tools for saving campaigns, tools for exporting campaign datasets that are usable to share, implement, or execute the campaign.

The configuration panel (114) includes an analytical component selector (128) and an offer type selector (130) that a user may interact with to modify the chart view (124). Available analytical components may be selected and added to the chart view (124) (e.g., either onto a single layer with varying visual characteristics, or spread across multiple layers that may be switched between and/or merged together). Analytical components that are available may vary by implementation, but may include raw metrics that describe information such as a number of purchases made by customers, a number of customer visits to a physical location or web location, or a recency of purchase, or may include ratings or scores that are based on raw metrics (e.g., brand engagement score, category engagement score). Analytical components may be easily added by selecting the corresponding checkbox, and the system may be configured to add each selected analytical component to its own new layer, or may be configured to add the selected component to the current layer (e.g., where Layer 1 is currently selected and visible, new components will be added to Layer 1).

The offer type selector (130) may be interacted with by a user to add offers, rewards, or benefits to a reward segment (140). Offers may be added by selecting the corresponding checkbox or button, or may be clicked and dragged into the desired reward segment (e.g., such as the offer (142) present in the reward segment (140)). An inspection panel (132) provides detailed control and configuration of offers, break points, reward segments, or other characteristics of the chart view (124). In the shown example, the inspection panel (132) is showing a detailed view for a selected offer that includes characteristics such as the offer type, the distribution date when the offer will be sent to recipients, a start and end date in which the offer may be exercised, the reward segment the offer is associated with, the effect of the offer (e.g., 15% discount on a $25 purchase, 25% discount on a $50 purchase), and the text of any terms and conditions that should be provided with the offer. A tabular view (134) shows detailed information associated with the currently configured campaign, including identification of breakpoints, location of breakpoints, type of offer associated with breakpoints, and other information that corresponds to the chart view (124) and inspection panel (132).

Figure 2:
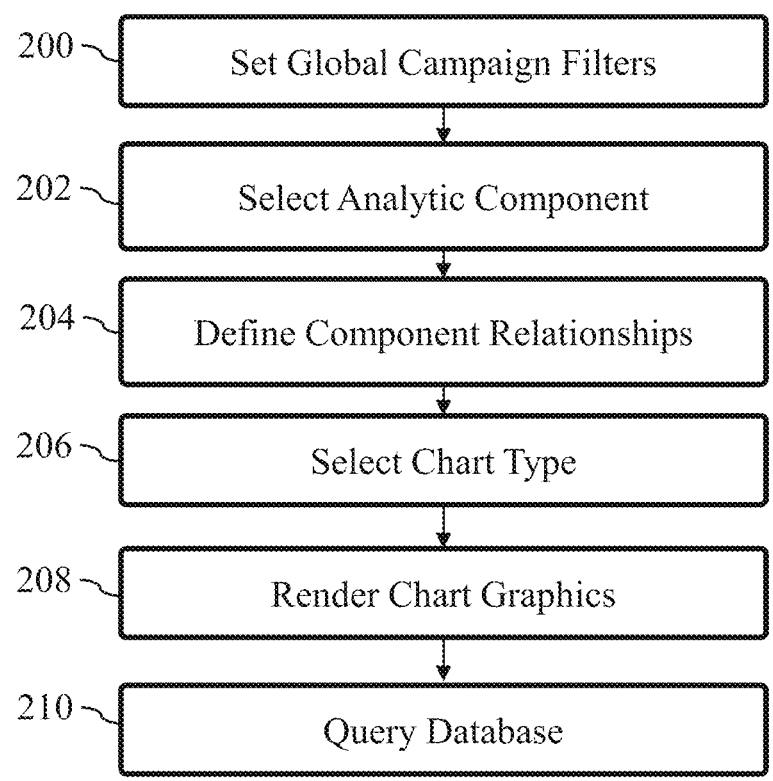
FIG. 2 is a flowchart of a set of steps that may be performed to configure the interface of FIG. 1C to display a chart view for a campaign.

FIGS. 2-6 show examples of steps that may be performed by the system during performance of some or all of the steps of FIG. 1A. FIG. 2 shows an example of steps that may be performed to initially configure a campaign, including defining the base data and analytical components on which the campaign will be built. This may include setting (200) global Filters for the campaign. These filters may be set to target specific customer profile demographics elements. For example, the user may want to only target customers living in a specific region of the country. The user may select (202) one or more analytical components. This provides data that will be used to generate a chart. Where more than one component is selected, a relationship will be defined (204) between the components. This may include assigning the components across different layers, assigning the components to the X or Y axis on a particular layer, or both. The user may use the components independently, or set one as primary and the other secondary, or may use Boolean relationship operators. For example, the user may set a priority for a component condition as primary, meaning that condition must apply and then secondly the user may add optional component conditions. The logical syntax may read as following, Component 1 Must meet Condition A, IF TRUE, then if Component 2 meets Condition B then Operation 1 or if Component 2 meets Condition C then Operation 2. This gives the user significant flexibility in defining granular audience segmentations. The use of the GUI allows that user to see the order of operations visually across the canvas.

In some implementations, the analytical components will default to generate a line chart, although alternative charts may be used, including but not limited to a bar chart, pie chart, or other visual representation of numerical data, and a preferred chart type or default type may be selected (206) by the user. As the user configures the chart (e.g., selecting analytical components, defining relationships, selecting chart type) the chart view (124) may continuously render (208) and update to reflect the currently configured campaign. This may include querying (210) a database to retrieve data associated with the global filters (200) and selected (202) analytical components so that it can be plotted on the chart view (124). These points may then be normalized to generate a line or curve that represents the currently configured campaign audience.

Figure 3:
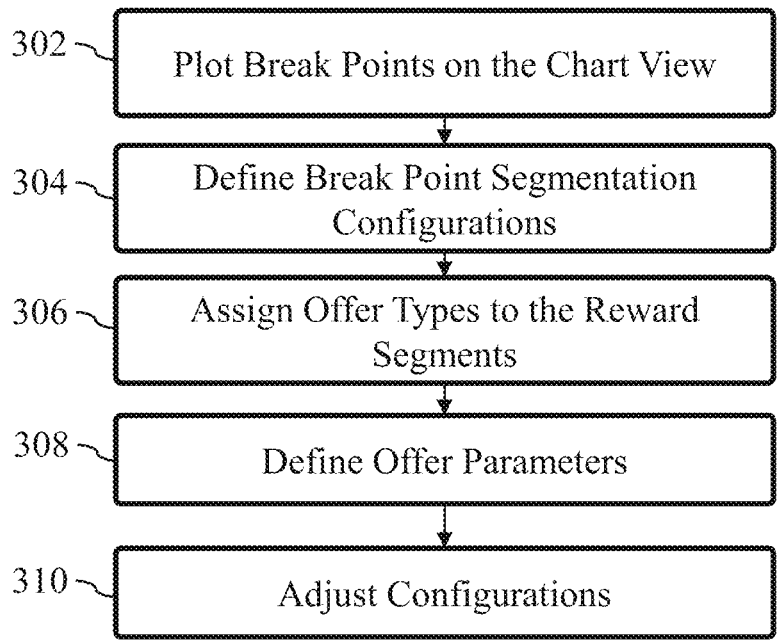
FIG. 3 is a flowchart of a set of steps that may be performed to associate campaign offers with the chart view of FIG. 2.

FIG. 3 shows an example of steps that may be performed to associate campaign offers with the chart view (124). The user may plot (302) breakpoints on the chart view (124) by interacting with a breakpoint tool to add one or more breakpoints. Breakpoints may appear in default locations (e.g., at a midpoint of a graph, or a configured distance from a previously added breakpoint), or may be added at a desired location by clicking on the chart view (124) at that location and after selecting the breakpoint tool. Breakpoints may also be selected with a pointer tool and dragged along the chart view (124) to a desired location. Breakpoints may also be modified by changing the data in the inspection view (132) or the tabular view (134), where a user prefers to deal with the more complex underlying data instead of using other simple click and drag tools.

A user may also configure (304) a segmentation configuration for each break point, which may include configuring a breakpoint to represent a horizontal segment break, a vertical segment break, or both a horizontal and vertical segment break. The segment breaks may be represented on the chart canvas as dashed lines or other visually distinct characteristics. Segmentation may be configured (304) by selecting a breakpoint and modifying data in the inspection panel to set the configuration, or by clicking a nearby rotate button or type-change button that may appear as a hover-over element when a breakpoint is selected.

A user may assign (306) offers to each segment, which may include selecting a reward segment from the chart view (124) and then selecting an offer type from the offer type selector (130) to assign to that reward segment, or may include clicking on an offer in the type selector (130) and dragging an icon associated with that offer into the desired reward segment, or may be performed in other ways. Offer types will vary by particular implementations, but may include offers such as "Cash Back", "Percentage Off", "Two for One". Offer types may be selected from a pre-configured list, or may be customized by a user of the system. Any reward segment that is not associated with an offer type will not be tracked or acted upon as part of the campaign, and may be omitted from any campaign dataset that is output upon completion of campaign setup. As has been described, a user may also interact with tools or other interface elements to highlight and view unassigned segments or link segments that will share the same offer type and offer parameters. In some implementations, a reward segment may have more than one offer type assigned.

The user may define (308) offer parameters for offers added to the campaign using the inspection panel (132) or an input that may pop and hover-over near an offer icon selected from the chart view (124). Inputs associated with an offer may be determined by an offer type (e.g., a cash back offer may have an input parameter for amount of cash back, while a percent discount offer will instead have a percentage value), and may include base offer characteristics, requirements for exercising the offer, or other limitations on the offer. Parameters may also include setting predictions on redemption (e.g., an estimate that 75% of customers that qualify for an offer will exercise it, an estimate of spending associated with exercising the offer) that may be used in subsequent modeling steps in order to forecast the results of the campaign. As a further example, configured parameters may also include start and end dates, and the text of any terms and conditions that should be provided or displayed with the offer.

Since the chart view (124) updates and renders in real time, which may also include providing forecasting information related to the campaign, as will be discussed in further detail below, a user may adjust (310) one or more configurations until the desired campaign configuration is achieved. This may include adjusting breakpoints, offer types, offer parameters, and analytical components.

Figure 4:
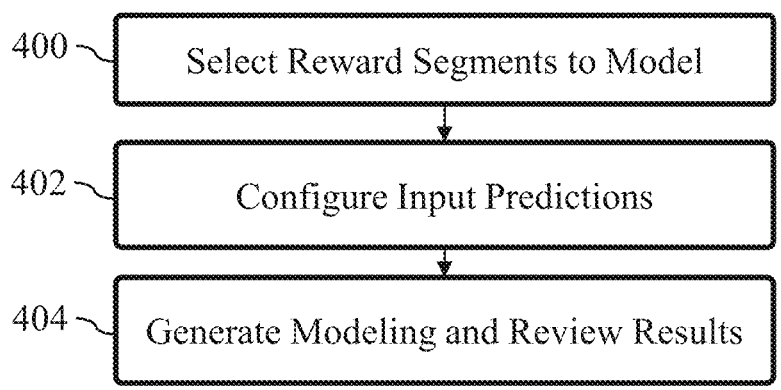
FIG. 4 is a flowchart of a set of steps that may be performed to produce a result forecast for the campaign of FIG. 2.

FIG. 4 shows an example of steps that may be performed to produce a result forecast for a campaign during configuration. The modeling process can be run by selecting (400) one or more reward segments from the chart view (124) and interacting with a tool button or other interface element to initiate the process. Modeling may be based upon a variety of data, for example, one or more of generalized metrics, campaign creator specific metrics, generalized predictions, or user configurations. User configured predictions for modeling may be configured (402) when setting parameters in the inspection panel (132), as has been described. Modeling results may be viewed via the inspection panel (132) in numerical and text formats (e.g., such as viewing a predicted ROI, a predicted number of offers that are exercised, or other metrics), may be displayed via the chart view (124) using visually distinct characteristics (e.g., a reward segment predicted to have a low or negative ROI may be highlighted in red), as will be described in more detail below.

The modeling results may then be generated (404) by querying a database that stores any underlying input metrics or historic data (e.g., user specific metrics, generalized metrics), identifying the campaign characteristics (e.g., the costs and requirements to qualify for certain offers or benefits), and factoring in any configured predictive inputs (e.g., predicted percentage of benefits that are exercised), and then displaying the results via the graph view (124), the inspection panel (132), or both. The model may indicate such estimated characteristics as overall projected campaign effectiveness, return on investment, initial cost, cost over time, or other characteristics. Generated (404) modeling may then be reviewed by the user and considered when finalizing and executing the campaign, or reconfiguring the campaign to achieve a better result. In some implementations, the modeling process of FIG. 4 may also include advanced predictive modeling that is configured to search for campaign configurations (e.g., changes to reward segments, offers, offer parameters, etc.) that will maximize one or more modeled characteristics, such as ROI. This may be performed using statically configured evaluation functions that test a variety of configurations, or may be performed using an artificial intelligence process such as a genetic algorithm configured to find a near-maximized solution.

Figure 5:
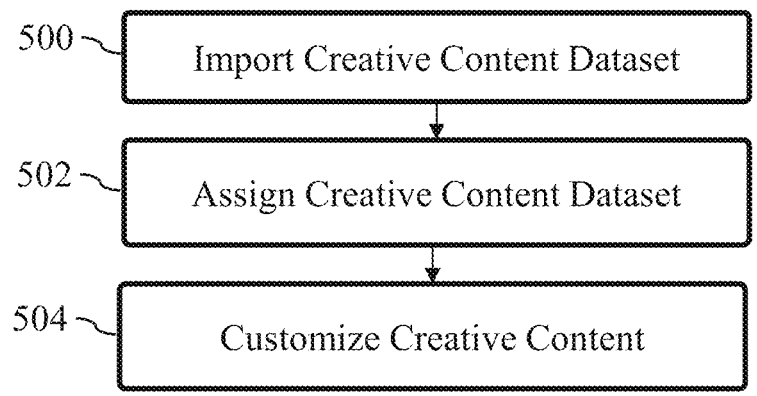
FIG. 5 is a flowchart of a set of steps that may be performed to produce creative content for the campaign of FIG. 2.

FIG. 5 is an example of a set of steps that may be performed to produce creative content for a campaign. A campaign may be associated with creative elements that will be provided with offers to customers that meet the configured requirements. This may include importing (500) a creative content dataset, which may include images and associated metadata (e.g., stored as XML, JSON, or another format) that describes how the corresponding images may be combined with text or other information when delivered to a qualifying customer. This may be advantageous where, for example, a campaign creator does not currently have, or may never have information describing the customers that may qualify for the offer. In such an example, a third party may serve as an intermediary that stores information describing the relationship between a business and a customer, and as a result the business may have only minimal information (e.g., name, email address) or no information (e.g., a customer may only be identifiable by a unique identifier that is recognized by the intermediary). Thus, the creative content dataset may not be directly usable by the campaign creator, but may be used by the intermediary to automatically generate and distribute graphical offers to recipients while protecting their privacy and anonymity.

A user may also assign (502) creative content dataset to particular portions of the chart view (124). This may include dragging icons corresponding to uploaded creative content to particular reward segments, particular offers, or both. As with other configuration changes and interactions with the chart view (124), these assignments will be reflected in the campaign dataset that is produced for the campaign, and may be usable by the campaign creator or a third party to implement and execute the campaign. When the campaign is executed, the configured creative content may be customized (504) for transmission to each recipient based upon the images, the corresponding metadata, and the configurations and associations with the campaign. This may include resolving the recipient's name, contact information, or other configured preferences, combining such information with other text (e.g., inserting a recipient's name at a placeholder in a larger text), and overlaying or otherwise associating the information with one or more images.

Figure 6:
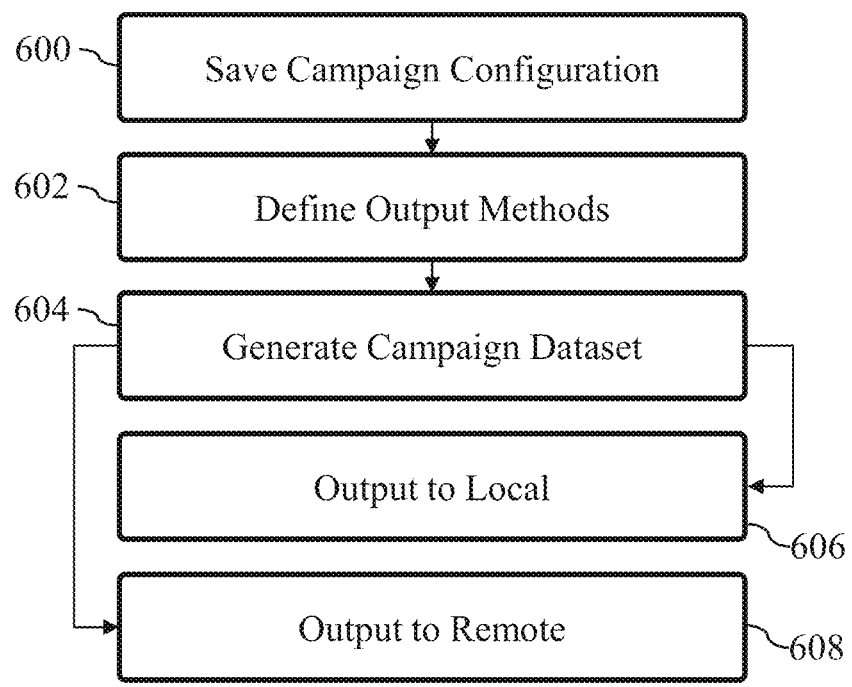
FIG. 6 is a flowchart of a set of steps that may be performed to produce a campaign dataset for the campaign of FIG. 2.

FIG. 6 is an example of a set of steps that may be performed to produce a campaign dataset for a campaign once it is finalized. Producing the campaign dataset may include saving (600) the campaign configuration in order to finalize the configured analytical components, break points, offers, and other configurations. A user may also define (602) an output method for the campaign, which may include defining a format corresponding to the system or party that will implement and execute the campaign. As an example, this may include specifying a particular file format or text output format that is compatible with a customer relationship management (CRM) system that will, based on the campaign dataset, identify recipients and transmit electronic messages that include offers. As another example, the campaign dataset may be output via an API or other software interface directly to a system or party that is responsible for executing the campaign. In such a case, defining the output format may include providing information that identifies the software interface and any credentials or other information required to successfully transmit the campaign dataset, and the format the dataset is transmitted in may be previously configured, or may be dynamically configured based upon an initial response from the recipient via the API that indicates the desired format.

The system may then generate (604) the campaign dataset based upon the configured campaign and the configured (602) output method. This may include querying a local database to retrieve information describing the configured campaign, and then converting or repackaging that information for the defined (602) output method. In this manner, the system may support a variety of third-party systems, without requiring that individual campaign creators have the knowledge or expertise required to prepare and particularize campaign data for each particular third-party system. The created (604) campaign dataset may then be provided (606) as output to a local system or device, which may include saving the output dataset to a local disk, USB storage device, or other memory device, or may be provided (608) as output to a remote system or device, which may including transmitting the output dataset to a remote system via an API, file transfer, or other software interface.

Figure 7:
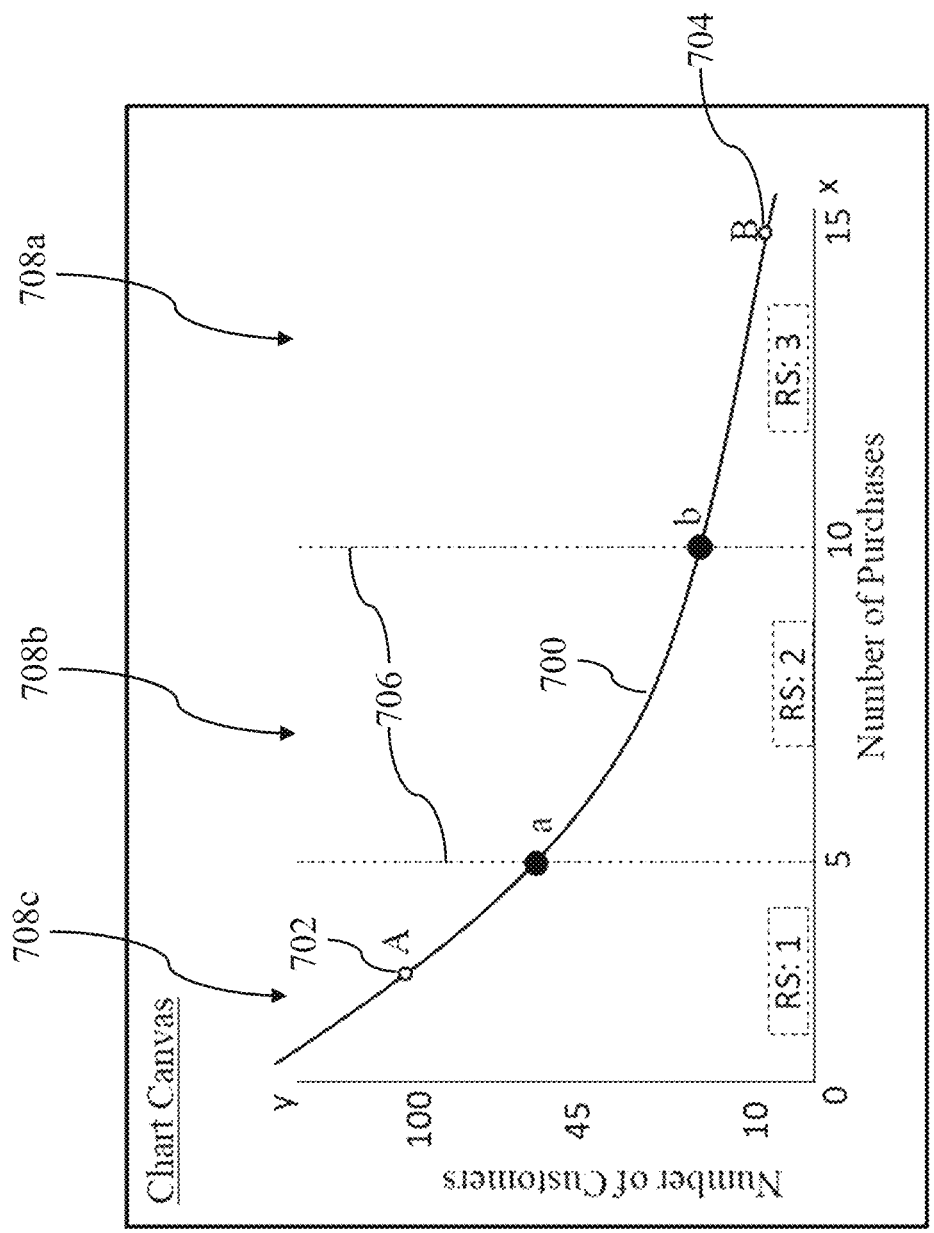
FIG. 7 is an illustration of a chart view for a campaign utilizing one primary analytical component.

FIGS. 7-10 show additional examples of interfaces during various stages of campaign creation and configuration. FIG. 7 shows the interface (122) during creation of a campaign utilizing one primary analytical component. In the example, the x-axis has been configured to represent an analytical component "Number of Purchases by Customer," as a primary component. The y-axis is represented by the summation count of the "Number of Customers by Number of Purchases." In this example, Y is a secondary component of X, meaning that Y further describes X graphically. For example, with a Global Filter of time set to the last 12 months, data point A (702) shows that there were 100 customers with three purchases over the last 12 months, and data point B (704) shows that there were five customers with over 15 purchases in the last twelvemonth. The line represents a normalization of the distribution of plot points.

The figure shows that two breakpoints (706) have been plotted on the chart view (124) against the values of the X-axis, as the primary component of the chart. Breakpoint (a) is set to 5 purchases, and breakpoint (b) is set to 10 purchases. The configured breakpoints generate three reward segments (708a, 708b, 708c) that define the audience for the campaign (e.g., all potential recipients). The first segment represents those customers with between 0-5 purchases in the last 12 months, the second segment represents those customers with 6-10 purchases in the last 12 months, and the third segment represents those customers with 11 or more purchases in the last 12 months. Breakpoints as well as the x and y axis scale may be configured by the user via the interface (122), as has been described. Once defined, the reward segments (708a, 708b, 708c) may be adjusted or moved along the graph, or may be assigned offers that will display as icons within the reward segment. The campaign dataset produced from a configuration such as that shown in FIG. 7 may include definitions for three different audience lists (e.g., either identifying the particular audience members, or providing parameters that may be used by a third party to identify the audience members), each assigned to their customized offer type and parameters.

Figure 8A:
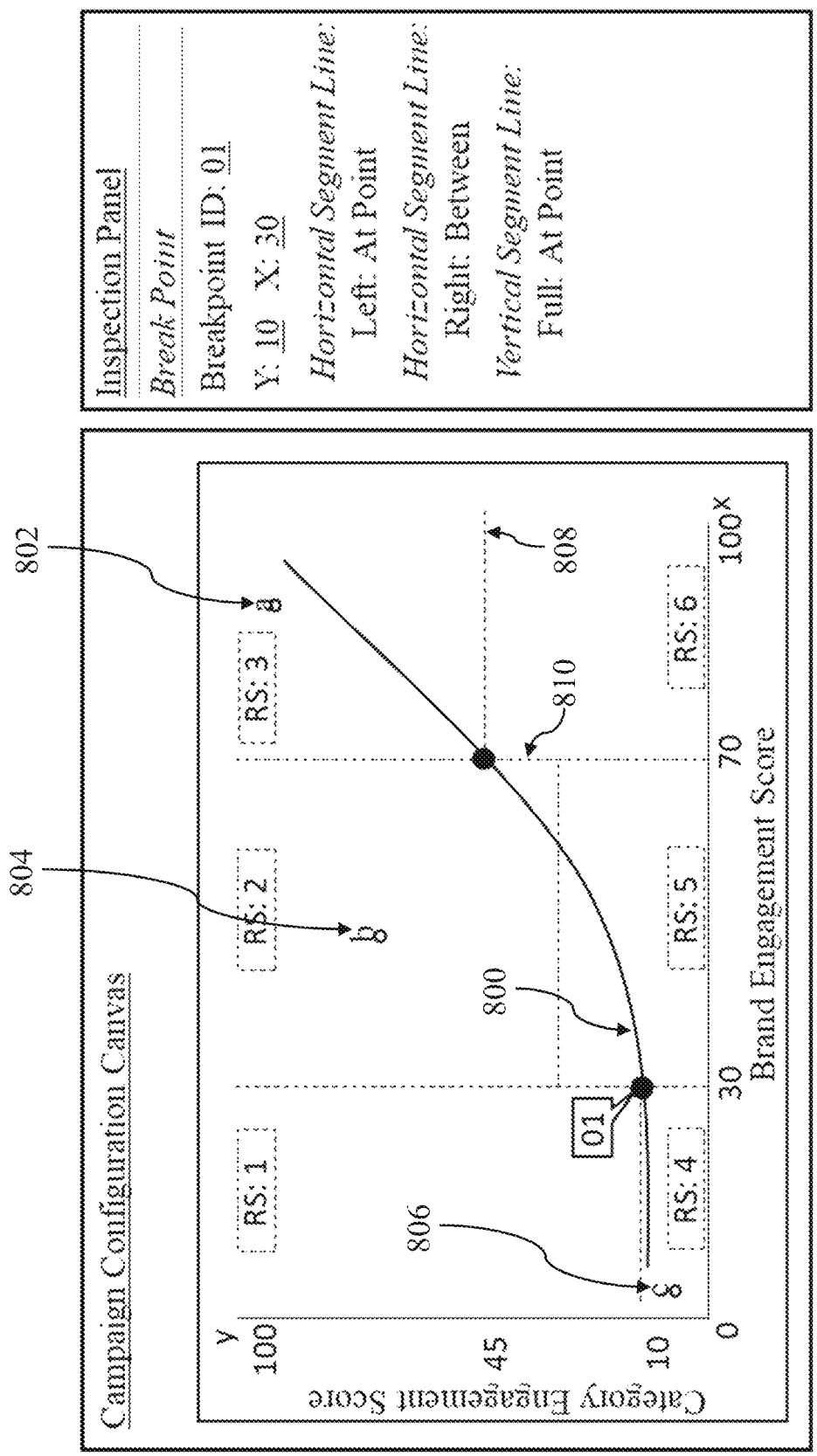
FIG. 8A is an illustration of a chart view for a campaign utilizing two primary analytical components and rectangular reward segments.

FIG. 8A shows the interface (122) during creation of a campaign utilizing two primary analytical components and rectangular reward segments. The X-axis component represents an engagement score of a customer with a brand, while the Y-axis component represents the engagement score of a customer within the broad brand category, such as retail clothing. Datapoint a (802) represents a customer who is highly engaged in the brand and highly engaged in the category. Datapoint b (804) represents a customer who is moderately engaged with the brand and highly engaged in the category. Datapoint c (806) represents a customer who is not engaged with the brand and not engaged with the category. There are different strategies that a brand may use based on the hypothetical customer's engagement with the brand and category, which is represented by the line (800).

A number of breakpoints, both vertical (810) and horizontal (808) are also shown, while the inspection panel (132) displays the unique metadata and parameters for each breakpoint. A user may view or revise the breakpoint configurations via the inspection panel (132) or direct interaction with the chart view (124) (e.g., clicking and dragging the breakpoint along its origin axis). The shown example includes six reward segments defined by two vertical breakpoints, and three horizontal breakpoints that are confined into the vertical reward segments. Each of the six reward segments may be associated with one or more unique offers (e.g., by clicking and dragging offers into the reward segment). As with prior examples, configuration and modification of the breakpoints, reward segments, and offers may be achieved with straightforward interactions with the interface (122) such as clicking and dragging graphical elements, while the results of such interactions will produce the complex configurations and parameters necessary to eventually create and output the campaign dataset.

Figure 8B:
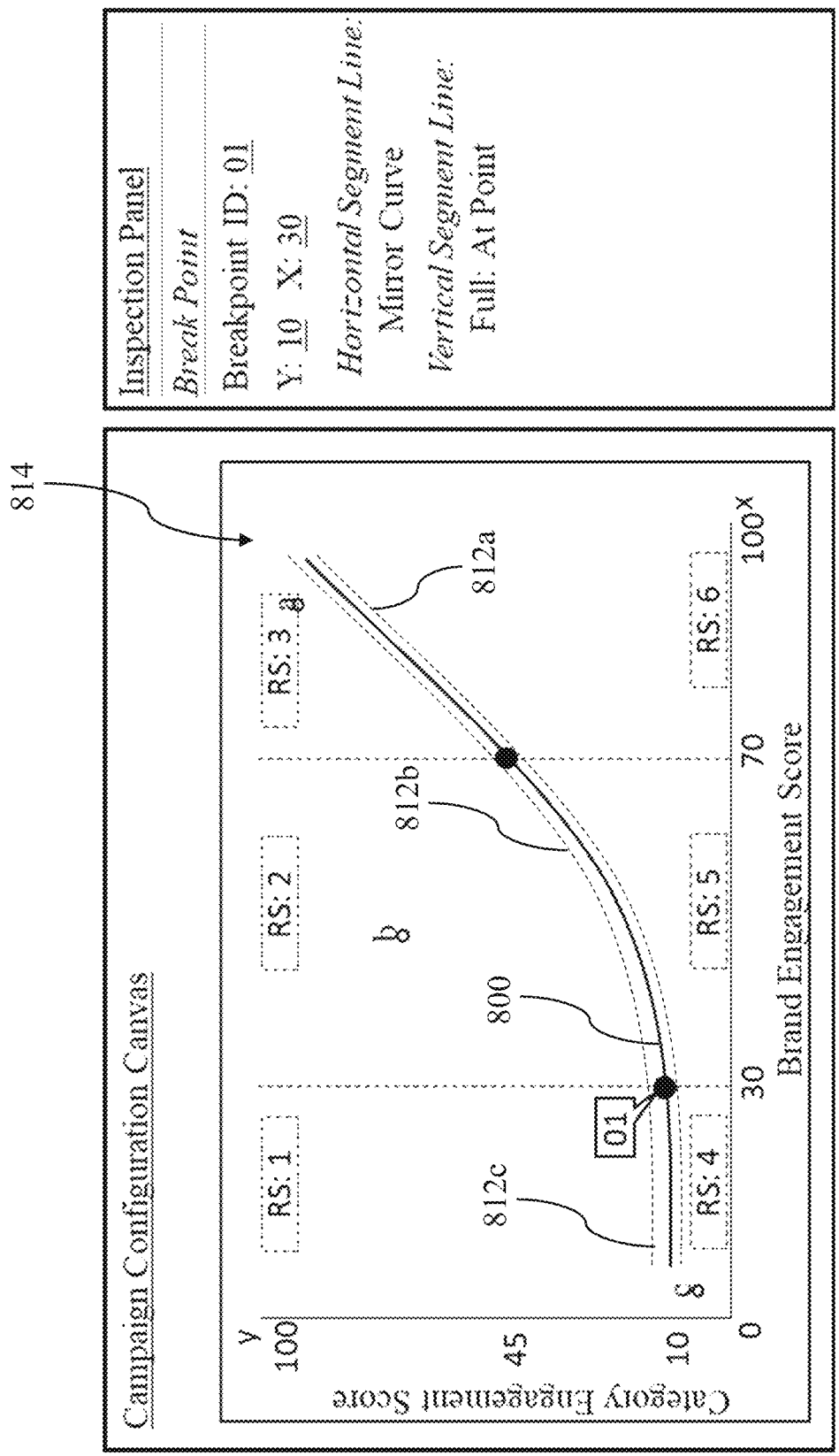
FIG. 8B is an illustration of a chart view for an alternate campaign utilizing two primary analytical components and curve-based reward segments.

FIG. 8B is an illustration of a chart view for an alternate campaign utilizing two primary analytical components and a combination of rectangular reward segments and curve-based reward segments. In the shown example, a series of curve-based reward segments (812a, 812b, 812c) exist within a configured proximity of the line (800), where the line (800) represents a somewhat idealized hypothetical customer (e.g., a customer whose growth in each analytical component grows steadily and equally). Rectangular reward segments still exist within the campaign and may be configured with offers as has been described. However, additional offers may be assigned to the segments (812a, 812b, 812c) defined along the curve by clicking and dragging offers into those segments. In this manner, a campaign creator may use a more precise tool for selecting an audience for their idealized reward segments. Other means may be deployed to select, trace, or mirror graph-oriented display points for segment definition. For example, a clustering approach, or a nearest neighbor may be represented and configurable into a reward segment. Customers qualifying for one reward segment (812a) may receive an offer associated only with that reward segment, or may receive that offer as well as an offer associated with a containing reward segment (814).

Based on the method used, the underlying architectural components may be interchanged to support the selected method. For example, use of a non-linear selection (e.g., a curve or circle, non-straight line) method as represented in FIG. 8B may be supported using an alternative database and database query component such as a graph-oriented database. For example, one option may be to use a graph query language such as Cypher which provides a visual and logical way to match patterns of nodes and relationships in the graph. Cypher is a declarative, SQL-inspired language for describing visual patterns in graphs using ASCII-Art syntax. This would be used as a substitute for SQL which is a common query syntax for relational databases. There are any number of databases and database query languages that could support the system.

Figure 8C:
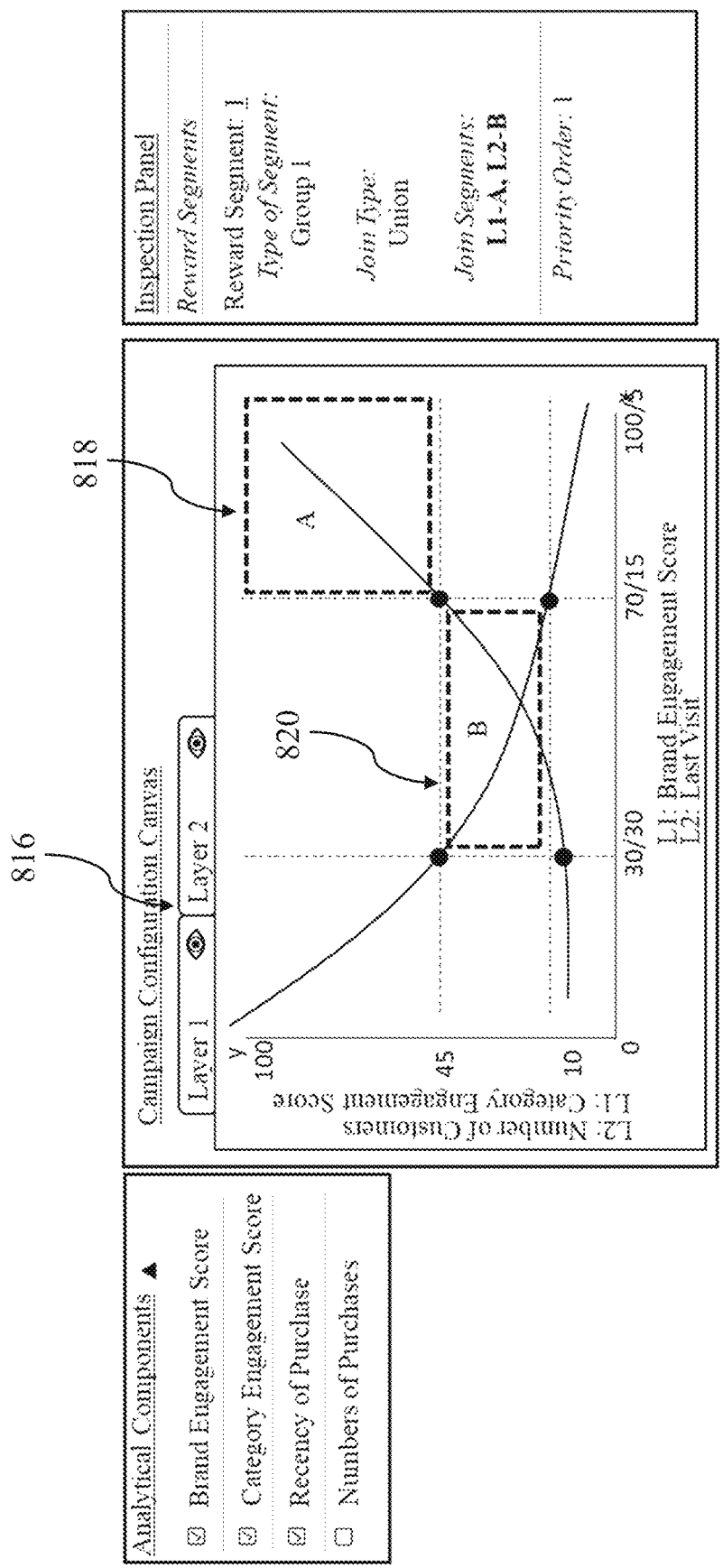
FIG. 8C is an illustration of a chart view for an alternate campaign utilizing three primary analytical components and rectangular reward segments.

FIG. 8C is an illustration of a chart view for an alternate campaign utilizing three primary analytical components and rectangular reward segments, with the chart view (124) displaying a merged layer view of the resulting campaign. As can be seen, three analytical components have been selected, brand engagement score, category engagement score, and recency of purchase. The campaign configured in FIG. 8C may be thought of as a combination of the analytical components included in the campaigns shown in FIGS. 7 and 8B. With analytical components assigned to separate layers, the user may interact with the layer tabs (816) to switch between layers, show or hide layers, or merge layers as shown in FIG. 8C.

In this manner, a campaign creator may group reward segments from different layers into a single campaign by merging or grouping them together. Grouping configurations may be assigned in the inspection panel (132), and may include naming a group (e.g., Group 1), determining the manner in which the group members are joined (e.g., union, or another logical operator), and specifying the segments that are members of the group. In the shown example, a reward segment group has been defined that combines section A (818) from Chart one and section B (820) from Chart two. The group represents an audience of customers who are highly engaged with both brand and category, and who have not visited the store in the past 15 days. In this manner, the system provides great flexibility in narrowly defining and targeting particular customer for offers or benefits that may be configured to draw them into a retail location or otherwise re-engage them with the campaign creator. As with prior examples, the configuration of the campaign shown in FIG. 8C may be achieved with interactions with clickable and draggable components that will cause the campaign dataset to be populated with the more complex underlying rules for identifying and executing the desired campaign.

Figure 9A:
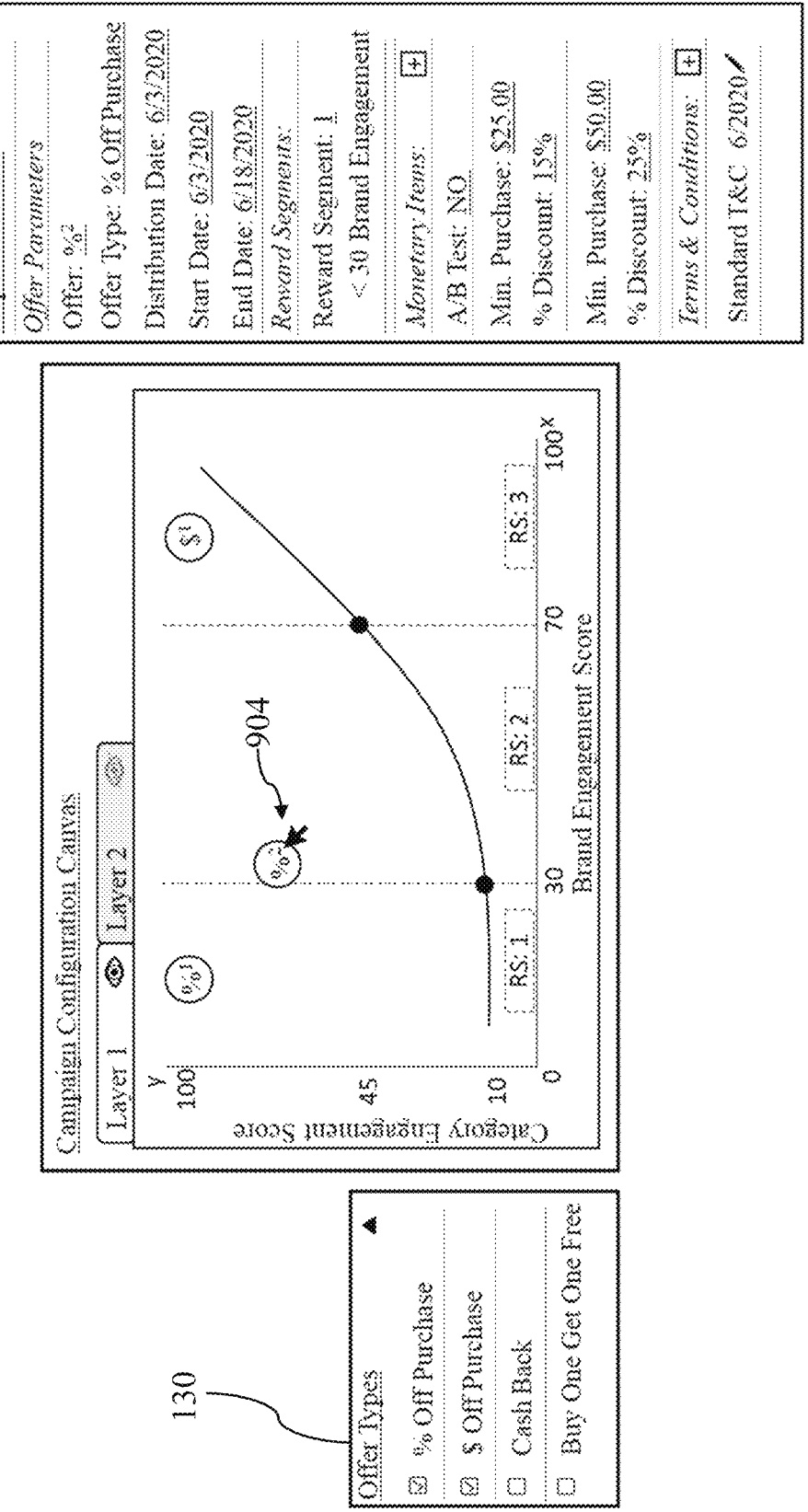
FIG. 9A is an illustration of an interface for assigning offers to reward segments.

FIG. 9A is an illustration of an interface for assigning offers to reward segments and configuring offer parameters. Offer types are selected via a checkbox in the offer type selector (130) and, once selected, may be available to be placed on a reward segment. While using a selection tool (e.g., a mouse cursor or other activated tool), the user may drag and drop the offer type onto the chart view (124) in the desired segment as illustrated (904). Once the offer is present in the reward segment, the inspection panel (132) may automatically update to provide input boxes and other interface elements that allow parameters of the offer to be configured or, where default parameters are provided, modified.

In some implementations, the configured offer parameters may include an option for A/B testing. A/B testing is the process of comparing two versions of an offer, type and measuring the difference in performance. This provides the user the ability to configure an A/B test on an element within a reward segment. When configured for such testing, the campaign may provide modeling for each offer type once configured, and may provide a button that allows a one-click selection to confirm one tested option and discard the other.

Figure 9B:
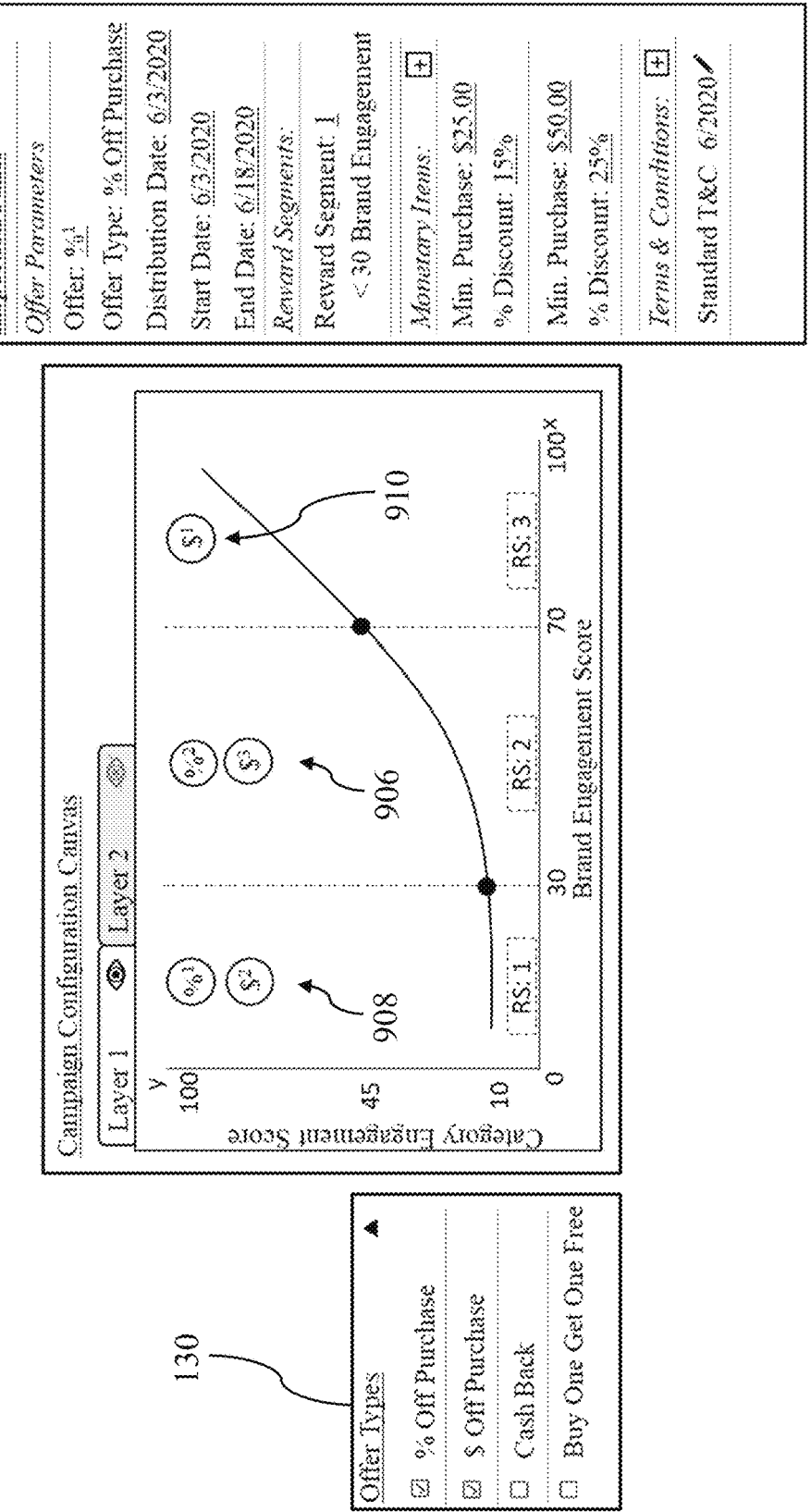
FIG. 9B is an illustration of an interface for assigning multiple offers to reward segments.

FIG. 9B is an illustration of an interface for assigning multiple offers to reward segments. As can be seen, the configured campaign includes a reward segment (906) with two offers, another reward segment (908) with two offers, and a third reward segment (910) that includes only a single offer. As with prior examples, multiple offers may be added to reward segments by clicking and dragging them from the offer type selector (130), or by selecting a reward segment and clicking an offer type, or by other means. The inspection panel (132) may allow a user to switch between each of multiple offers and modify parameters as desired.

Figure 9C:
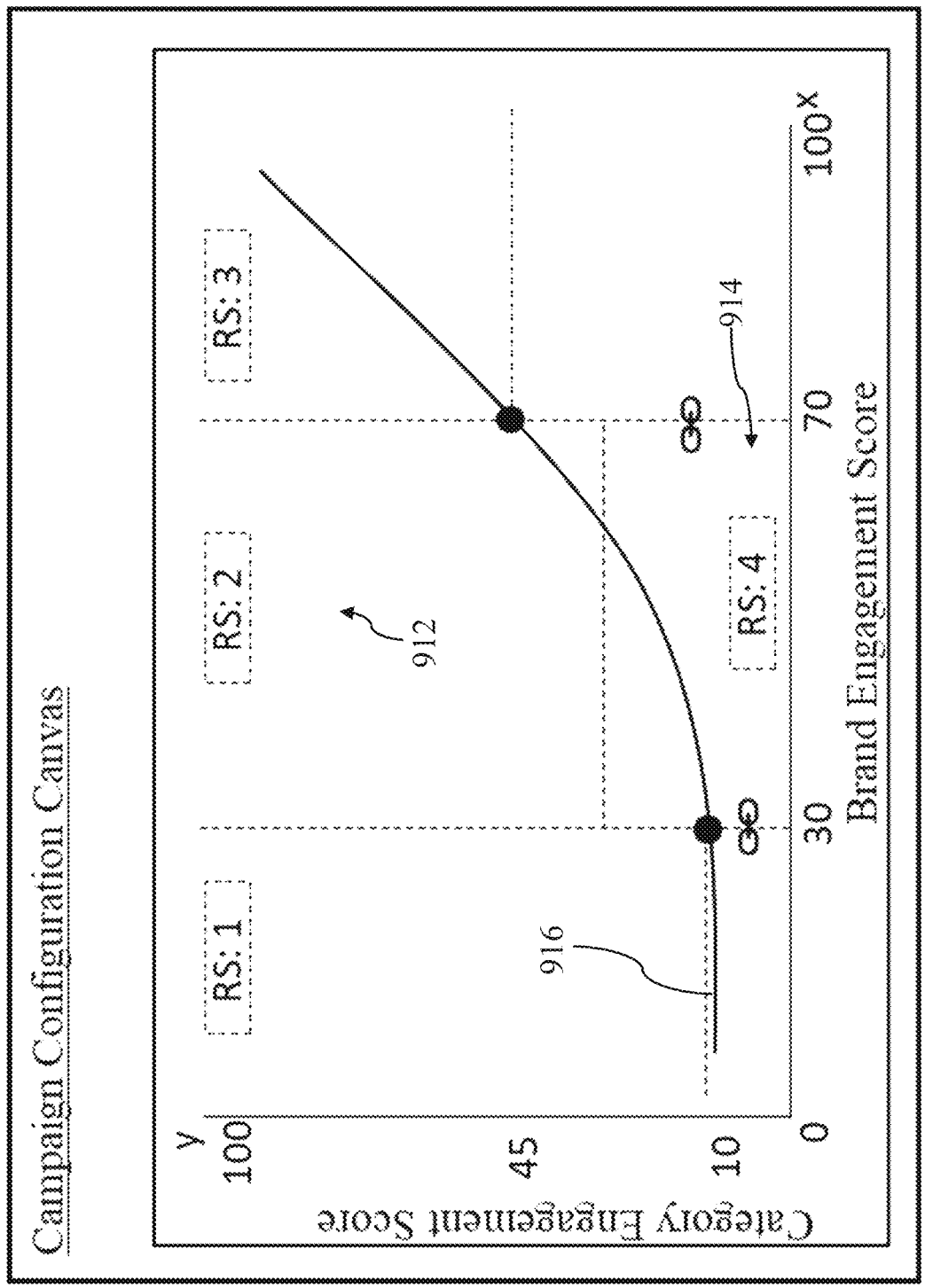
FIG. 9C is an illustration of an interface for associating offers into offer groups.

FIG. 9C is an illustration of an interface for configuring reward segments into groups that will share the same offer, offer parameters, and other characteristics. Based upon prior examples, the illustration of FIG. 9C can be seen to have six reward segments defined by two vertical breakpoints and three horizontal breakpoints. In some cases, a user may wish to associate a single offer type with multiple reward segments, such as where users falling below the line (916) will all receive the same offer without requiring that the user separately configure multiple duplicates of that offer. In such a case, the user may interact with a grouping tool, or click on a breakpoint separating two reward segments to cause a button to appear and hover-over that may be clicked on to adjust grouping options for those reward segments. In this manner, the customer may easily configure the three reward segments falling below the line (916) into a single grouped segment (914) (e.g., RS:4), while other ungrouped segments such as the segment RS:2 (912) may still be individually configured with offers.

Figure 10:
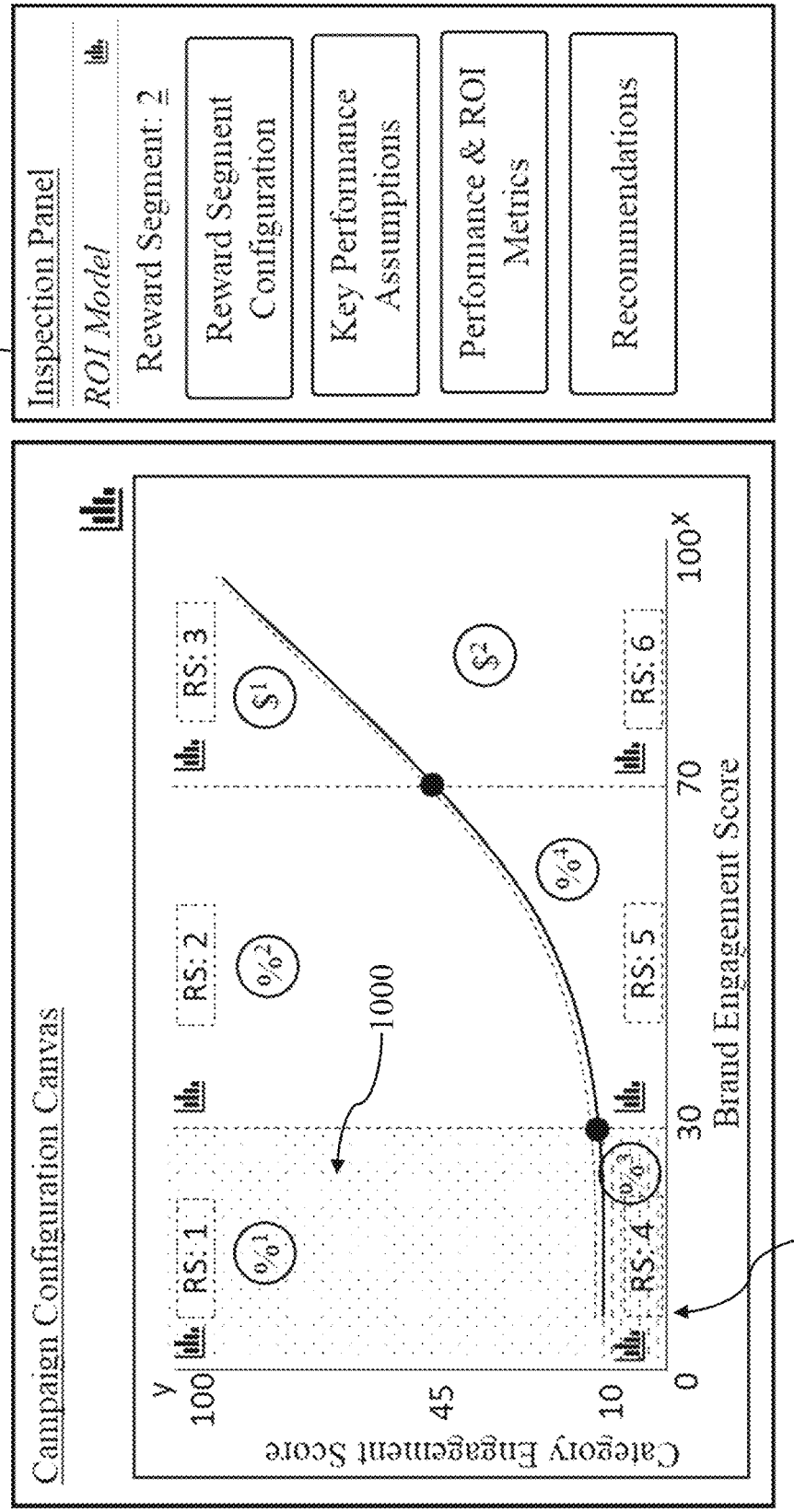
FIG. 10 is an illustration of an interface for forecasting the results of a configured campaign.

FIG. 10 is an illustration of an interface for forecasting the results of a configured campaign. A user may want to simulate the campaign's return on investment or other performance against expectations. The user may input assumptions based on their own knowledge, historical performance of campaigns, or other information. These assumptions may be used to calculate an expected outcome for the campaign across various performance metrics.

The illustration is representative of a display after the simulation is completed. Performance results are generated for each reward segment and for the entirety of the campaign configuration specification. A user may select the charting icon to view the results. The results may display in the inspection panel and be viewable as text, numbers, or other visual indicators of success or failure (e.g., a checkmark, thumbs up, thumbs down, a green circle, a red circle, etc.). Alternatively, the results may appear on another section of the screen or within another display screen like a pop-up window. The results may include information regarding the reward segment configuration, key input performance assumptions, the performance metrics e.g. ROI or Costs, and may include system generated smart recommendations to improve the campaign configuration to yield a better performance outcome, which may be automatically configured with a one-click operation that causes the campaign to update, re-render, and recalculate the forecasting model.

Campaign forecasting may also include visually highlighting or distinguishing certain reward segments, certain offers, or other characteristics of the chart view (124). For example, a reward segment that targets an audience with an offer that, based on the forecast, is associated with a cost that exceeds the forecasted benefit may be highlighted with a particular color, pattern, dynamic display (e.g., flashing or alternating colors), or other visual element. As an example, FIG. 10 shows the interface (122) during forecasting of a campaign. A first reward segment (1000) is highlighted with a first pattern to indicate that the forecast predicts a very high level of ROI or other success metric, while a second reward segment (1002) is highlighted with a second pattern to indicate that the forecast predicts a low level of ROI or even a loss. The inspection panel (132) is configured to show detail relating to the forecast, and may allow users to switch between segments, select and reconfigure segments, view detailed performance and ROI metrics, or review and accept recommendations that the system determines will provide improved forecast results.

Figure 11:
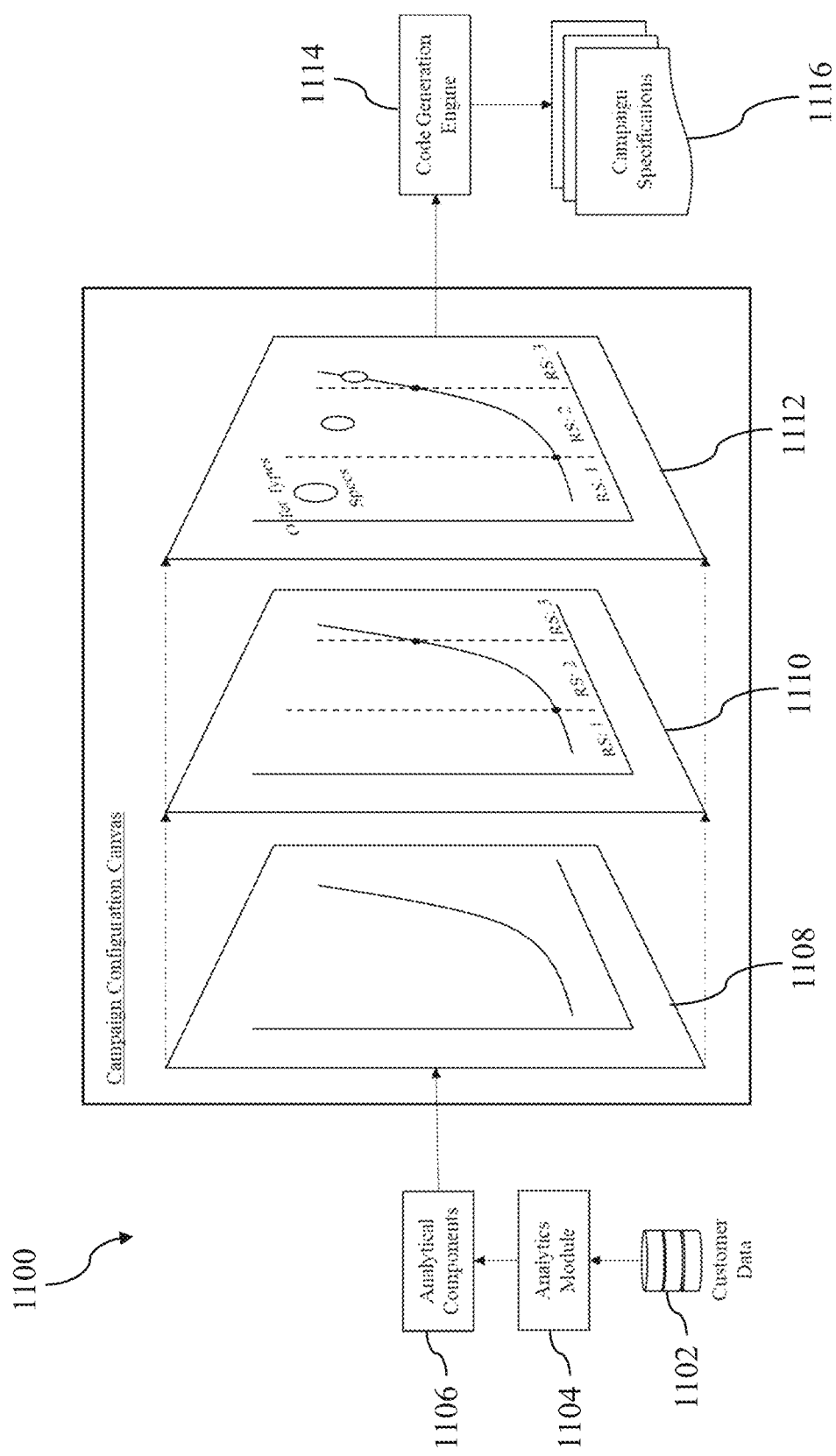
FIG. 11 is a schematic diagram showing several stages of campaign creation.

FIG. 11 is a schematic diagram showing several stages of campaign creation and associated system components. The system (1100) may utilize an external consumer data repository, such as a Consumer Relationship Management (CRM) system or a consumer data warehouse (1102). The customer data (1102) may be stored on a database controlled by the campaign creator, or a third party, or may be shared between (e.g., the campaign creator may possess a unique identifier that the third party may use to identify a particular customer). The system may include an analytical module (1104) that is configured to query the consumer data repository for relevant consumer attributes and predicative behavioral determinates. The user selects the determinants represented as analytical components (1106).

The selected analytical component (1106) data may be converted to a graphical visualization (1108) on a normalized distribution and displayed via the chart view (124). This sets the base coordinates of the audience. Following the process outlined above, the user may create reward segments, as represented by breakpoints and segment dividers, in order to create a graphical visualization of audience categories (1110). The breakpoints and segment dividers inherit the underlying chart coordinates which define the reward segment audience selection criteria from the originating customer database. The user then may assign offer types to the reward segments and configure offer parameters for each offer to create a visualization of the campaign (1112).

Once the user is satisfied with the campaign specification, the user may output campaign specifications in a selected output format for consumption by downstream applications or systems. A code generator (1114) will convert the graphical representations of the campaign into a campaign dataset (1116), which may include text data, software code, images, metadata, or other data types. The output code may be saved to a storage device or transmitted via an application program interface (API) to another system.

Varying applications of the disclosed system provide a number of advantages as compared to conventional systems, several of which have been described. Some applications of the disclosed system provide a GUI that advantageously allows a user to perform simple interactions (e.g., clicking, dragging, selecting) in order to produce complex output in the form of a campaign dataset, which may include images, software code, modeled metadata (e.g., stored as XML, JSON, or other structured data), and other information. Table 1 below shows an example of a portion of XML style code that may be generated based upon a user's interactions with the GUI when configuring a campaign. As can be seen, user selections of analytical components, breakpoint placements, offer placements, and other parameter configurations may be automatically converted into a structured format that may be directly used, or readily converted in other types or formats that may be supported by a CRM or other software application configured to execute the campaign.

TABLE 1

XML Style Code Generated by GUI

```
<Campaign>
  <Global>
    <Region>US</Region>
    <Income>50000</Income>
    <Months>12</Months>
  </Global>
  <Components>
    <Primary>BrandEngage</Primary>
    <Primary>CategoryEngage</Primary>
    <Primary>LastPurchase</Primary>
    <Secondary>CustomerTotal</Secondary>
  </Component>
  <Breakpoints>
    <BP1>
      <Style>vertLine</Style>
      <Location>50</Location>
      <Grouped>False</Grouped>
    </BP1>
    <BP2>
      <Style>horizLine</Style>
      <Location>40</Location>
      <Grouped>False</Grouped>
    </BP2>
    <BP3>
      <Style>followCurve</Style>
      <Location>50,75</Location>
      <Grouped>False</Grouped>
    </BP3>
    <BP4>
      <Style>circle</Style>
      <Location>25,50</Location>
      <diameter>20</diameter>
      <Grouped>False</Grouped>
    </BP4>
  </Breakpoints>
  <Segments>
    <SEG1>
      <Boundary>greaterThan.BP1,lessThan.BP2</Boundary>
    </SEG1>
    <SEG2>
      <Boundary>lessThan.BP4</Boundary>
    </SEG2>
    <SEG3>
      <Boundary>lessThan.BP3</Boundary>
    </SEG3>
  </Segments>
  <Offers>
    <OF1>
      <Location>SEG1</Location>
      <Type>percentOff</Type>
      <Trigger>
        <PurchaseTotal>50.00</PurchaseTotal>
        <Value>15%</Value>
      </Trigger>
      <Trigger>
        <PurchaseTotal>100.00</PurchaseTotal>
        <Value>25%</Value>
      </Trigger>
    </OF1>
```

TABLE 1-continued

XML Style Code Generated by GUI

```
    <OF2>
      <Location>SEG2</Location>
      <Type>cashBack</Type>
      <Trigger>
        <Purchasetotal>Any</Purchasetotal>
        <Value>10.00</Value>
      </Trigger>
    </OF2>
    <OF3>
      <Location>SEG3</Location>
      <Type>bogo</Type>
      <Trigger>
        <ItemNum>12410931</ItemNum>
        <Limit>2</Limit>
      </Trigger>
    </OF3>
  </Offers>
</Campaign>
```

The above applications and corresponding advantages are examples only, and others exist and will be apparent to those of ordinary skill in the art in light of this disclosure. The above applications provide specific improvements over prior systems and result in improved user interfaces for managing customer interactions, and at least some of the applications allow different systems to share information in real time in a standardized format regardless of the format in which the information was originally provided by the user (e.g., interactions with the GUI). Such applications cannot be practically applied in the mind, as it is not practical for a user to generate software code based upon displayed data such as that shown in the chart view (124) and the inspection panel (132) in real time as a campaign is configured, nor can such interactions as clicking, selecting, dragging, and dropping breakpoints, offers, or other GUI elements be performed in the mind.

Another application of the disclosed system advantageously allows for a data intermediary to facilitate interactions between a software platform and a userbase while protecting the security and anonymity of users. As an example, consider a scenario that includes a platform, an intermediary, and a userbase. The platform may configure and create a campaign dataset based in part upon anonymized information describing the userbase that is received from the intermediary. The campaign dataset may express logic that is usable by the intermediary to identify a plurality of recipients in the userbase that meet the campaign requirements, or may include unique identifiers that associated with individuals in the userbase that meet the requirements of the campaign. The intermediary may receive the campaign dataset and use it to identify and provide communication to the plurality of recipients (e.g., by querying its own database using the logic rules and other requirements, or by querying its own database using the unique identifiers).

Another application of the disclosed system advantageously minimizes the number of interfaces, files, web locations, or other data locations that a user must interact with when configuring a campaign, which may reduce processor, disk, and network usage, and may reduce the possibility for user or technical errors when switching between interfaces (e.g., user errors when opening and closing files, technical errors when loading and passing information between to web locations).

Figure 12:
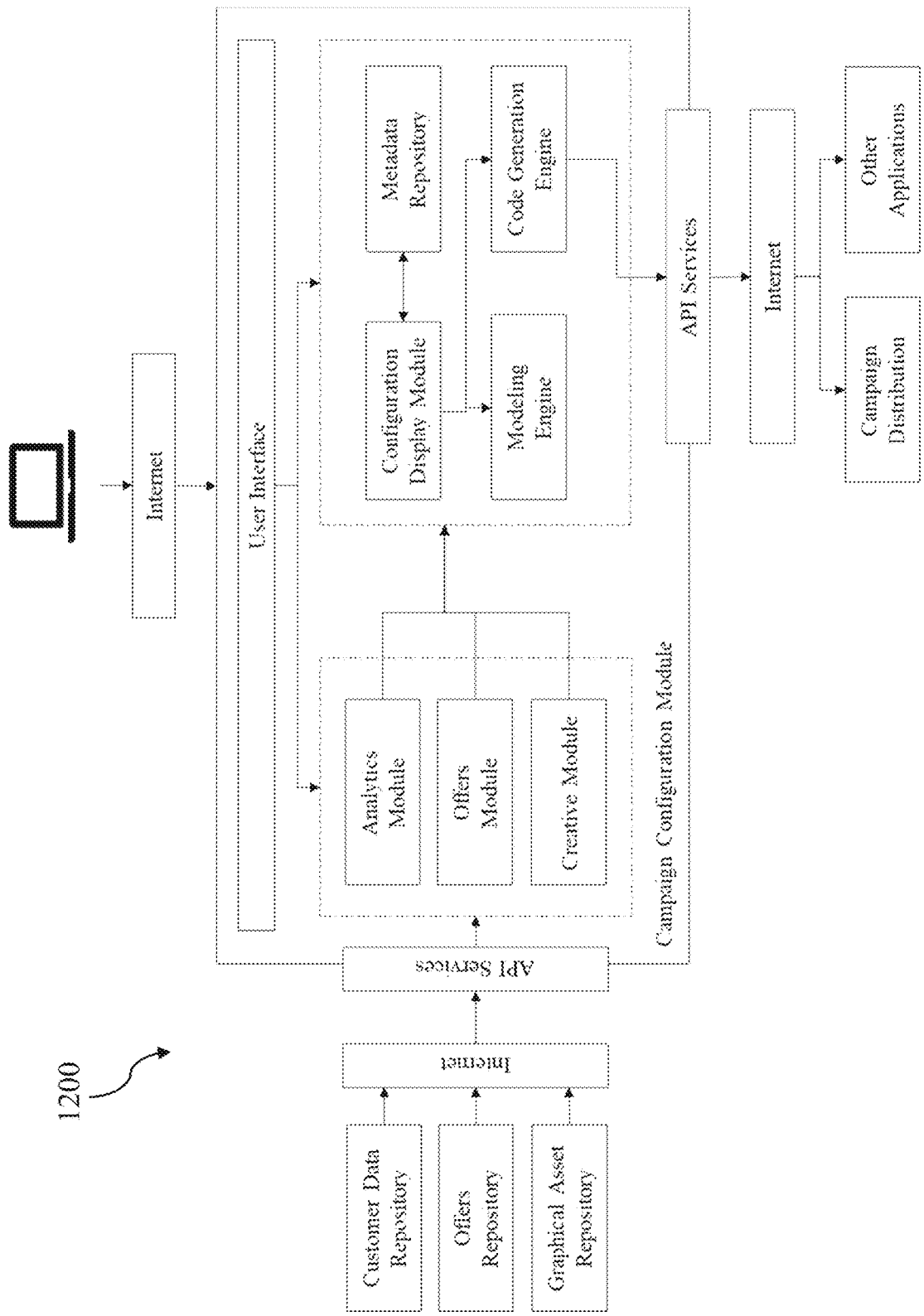
FIG. 12 is an architecture diagram of a first portion of a system configured to perform the steps of FIG. 1A.

FIG. 12 is an architecture diagram of a first portion (1200) of a system configured to perform steps such as those shown in FIG. 1A. The campaign configuration system may include multiple components to assist in performing this function. The campaign configuration system may include a computer, including a processor and a memory. The computer may allow a user to interact with the campaign configuration system. The campaign configuration system may include multiple computers, allowing multiple users to interact with the campaign configuration system. Users may provide input to the computer by a keyboard and/or a pointing device (e.g., a mouse or a trackball).

The campaign configuration system may include a campaign configuration module to retrieve prior campaigns, generate graphical chart views of customer attributes, assist in the creation and modification of campaign specifications, perform ROI modeling calculations, generate code-based output specifications for other application systems and perform several other functions in providing assistance to users in creating a campaign. The campaign configuration module may include an interface to handle at least some of the communication of the campaign configuration module. For example, the campaign configuration module may communicate with the computer via an Application Program Interface (API) service. The campaign configuration module may communicate with other applications via API services. Such applications may include a customer data repository, offer management systems, creative asset management repositories, campaign distribution applications, and other miscellaneous applications.

Additional components may be included in the campaign configuration module. For example, the campaign configuration module may include an analytics module to generate one or more analytical components based on user inputs. The campaign configuration module may include an offers module to allow a user to select pre-configured offer types or create offer types to be used with in a campaign. The campaign configuration module may include a creative module to allow the user to associate graphical campaign artwork to a campaign configuration. The campaign configuration module may include a configuration display module to graphically illustrate, construct and model a campaign configuration. The campaign configuration module may include a metadata repository that stores all the campaign specific parameters and associated information used by the system to generate campaign specifications. The campaign configuration module may include a modeling module to allow the user to calculate the expected performance of a configuration specification based on user input and/or historical offer performance information. The campaign configuration module may include a code generate module that converts the graphical configuration, associated metadata and other information into the users selected campaign specifications' output format.

Figure 13:
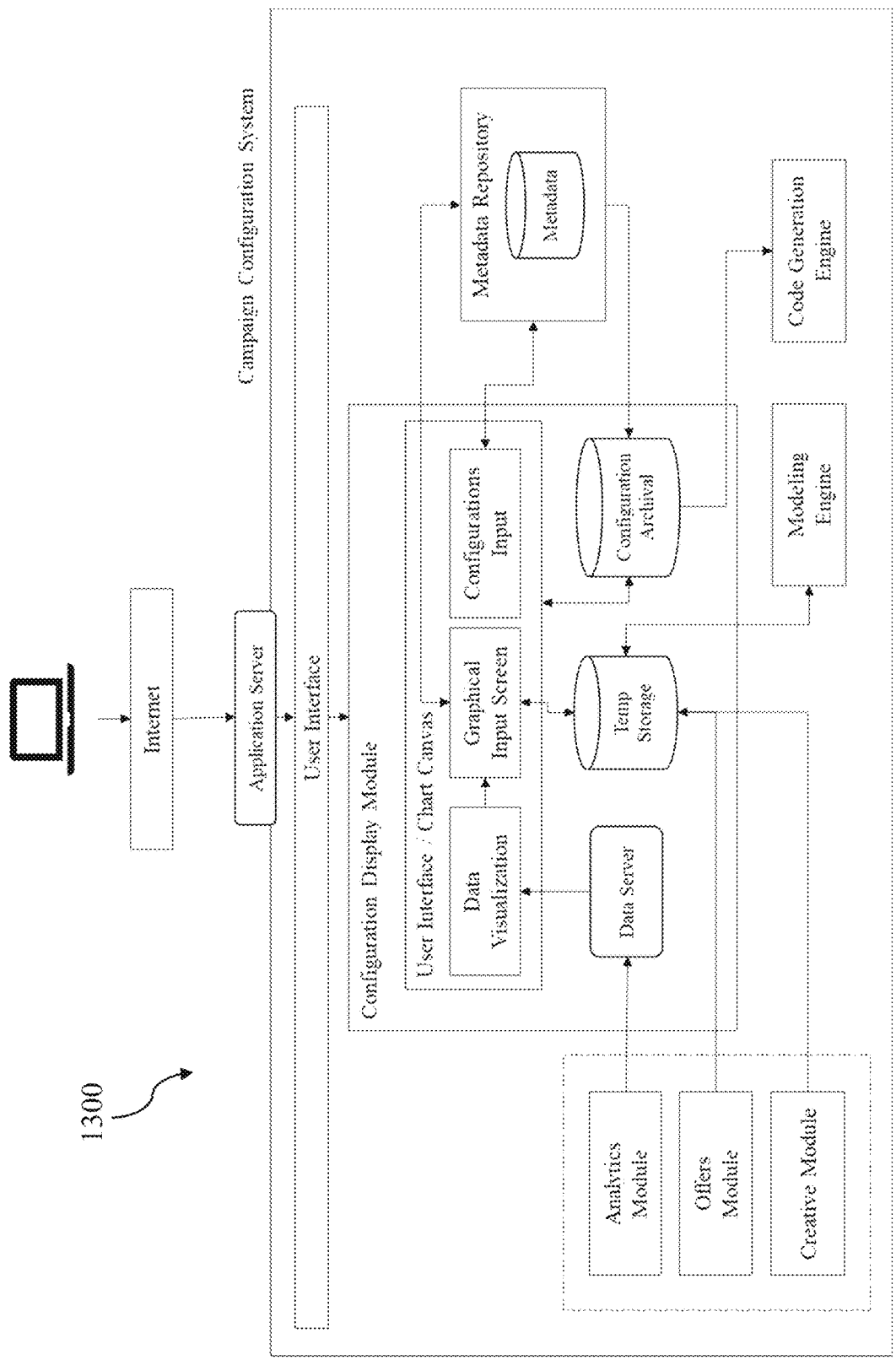
FIG. 13 is an architecture diagram of a second portion of a system configured to perform the steps of FIG. 1A.

FIG. 13 is an architecture diagram of a second portion (1300) of a system configured to perform steps such as those shown in FIG. 1A. A configuration display module receives input from other system components, both internal and external as shown in FIG. 12. The configuration display module also may receive input from user interactions. The configuration display module may output data to other system components as well as output to system components that communicate with external applications and systems as shown in FIG. 12.

The Analytics Module may be configured to store the logic for the analytical components used to generate the base chart on the chart canvas. User selected analytical components generate data which is sent from the analytics module to a data server that feeds into a data visualization service. The data visualization service provides the graphical representation of the analytical components.

The configuration display module may include a graphical input screen the provides the user with the ability to interact with the chart canvas. The user may use the chart canvas as described in the processes above, including but not limited to, segmenting a customer population into audience segments, converting an audience segment into a reward segment, assigning offer types available from the Offer Module configuring the offer parameters, modeling, saving and outputting the final campaign specification.

Any of the modules may utilize a temporary storage device to cache information from the user session. The temporary storage may include data, files, logs and other system generated and/or user generated information. The temporary storage may receive input from the offer module and the creative module. This information may render graphical elements in the chart canvas and may feed meta data accessible to the metadata repository.

A chart view (e.g., such as the chart view (124)) may have a configurations input screen to capture metadata detailed parameters regarding the unique user configuration. A metadata repository may be utilized to store and cache metadata for each setting.

When executing a modeling process, the modeling engine may pull the current campaign configuration from the temporary storage, run the selected modeling calculations, and return the results to the temporary storage component which may render the results within the user interface. The results may be displayed within the chart view as has been described, or may be displayed using other methods.

The configuration archival may be utilized to store the campaign configuration and associated data, files or other items associated with the configuration. The configuration archival may be used to retrieve saved campaigns. The configuration archival may also send information, data, specifications to the code generation engine which formats the campaign specification into one or more output types for consumption by other applications and systems.

It should be understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of protection provided by this document, or any document which is related to this document, should be understood as being defined by the claims in such document when the terms in those claims set forth under the heading "Explicit Definitions" are given their specified definitions, and the remaining terms are given their broadest reasonable interpretation as provided by a general purpose dictionary. Such protection should be understood not to be limited to the details of structure and operation shown and described in the specification and drawings.

Explicit Definitions

When used in the claims, "based on" should be understood to mean that something is determined at least in part by the thing that it is indicated as being "based on." When a claim is written to require something to be completely determined by a thing, it will be described as being "based EXCLUSIVELY on" the thing.

When used in the claims, "computer readable medium" should be understood to refer to any object, substance, or combination of objects or substances, capable of storing data or instructions in a form in which they can be retrieved and/or processed by a device. A computer readable medium should not be limited to any particular type or organization, and should be understood to include distributed and decentralized systems however they are physically or logically disposed, as well as storage objects of systems which are located in a defined and/or circumscribed physical and/or logical space. Examples of computer readable mediums including the following, each of which is an example of a non-transitory computer readable medium: volatile memory within a computer (e.g., RAM), registers, non-volatile memory within a computer (e.g., a hard disk), distributable media (e.g., CD-ROMs, thumb drives), and distributed memory (e.g., RAID arrays).

When used in the claims, "first," "second" and other modifiers which precede nouns or noun phrases should be understood as being labels which are intended to improve the readability of the claims, and should not be treated as limitations. For example, references to a "first analytic component" and a "second analytic component" should not be understood as requiring that one of the recited analytic components precedes the other in time, priority, location, or any other manner.

The invention claimed is:

1. A method for generating computer readable data defining actions to be performed for corresponding targets using a graphical user interface, the method comprising:
   a) dynamically updating a graph view portion of the graphical user interface based on selection of one or more analytic components, wherein the graph view portion illustrates potential action targets on a graph with axes defined by the selected one or more analytic components;
   b) providing, in the graphical user interface, one or more segment definition tools operable by a user of the graphical user interface to define a set of segment borders, and illustrating the set of segment borders on the graph with axes defined by the selected one or more analytic components;
   c) providing, in the graphical user interface, one or more action tools operable by the user of the graphical user interface to define and associate actions with subsets of the potential action targets illustrated in regions defined by the set of segment borders on the graph with axes defined by the selected one or more analytic components;
   d) identifying an unassigned subset of the potential action targets as not associated with an action;
   e) based on identifying the unassigned subset of potential action targets, updating the graph view portion of the graphical user interface to visually distinguish the region defined by the set of segment borders corresponding to the unassigned subset of potential action targets; and
   f) automatically generating the computer readable data defining actions to be performed for corresponding targets by encoding data comprising:
      i) a universe of potential action targets;
      ii) the one or more selected analytic components;
      iii) one or more target segments encoded using the set of segment borders in analytic space defined by the one or more selected analytic components; and
      iv) one or more actions, each of the one or more actions having been defined by the one or more action tools and corresponding to a target segment from the one or more target segments.

2. The method of claim 1, wherein the method comprises:
   a) associating each of the one or more actions with a subset of the potential action targets;
   b) for each of the one or more actions, forecasting an expected result of applying that action to the associated subset of the potential action targets; and
   c) providing, in the graphical user interface, a simulation result tool operable by the user of the graphical user interface to view, for each of the one or more actions, the expected result forecasted for that action.

3. The method of claim 2, wherein the method comprises, for at least one action from the one or more actions:
   a) determining that the expected result for that action is negative when accounting for cost of that action; and
   b) based on determining that the expected result for that action is negative, updating the graph view portion of the graphical user interface to visually distinguish the region defined by the set of segment borders corresponding to the subset of potential action targets associated with that action.

4. The method of claim 2, wherein:
   a) the method comprises providing, in the graphical user interface, one or more model definition tools adapted to allow the user of the graphical user interface to specify forecasting parameters for a corresponding action; and
   b) for at least one of the one or more actions, forecasting the expected result of applying that action is performed based on parameters specified by the user of the graphical user interface.

5. The method of claim 1, wherein:
   a) the method comprises providing, in the graphical user interface, an analytic component selection operable by the user of the graphical user interface to select from analytic components comprising:
      i) recency of purchase;
      ii) brand engagement;
      iii) category engagement; and
      iv) number of purchases;
   b) the one or more actions comprise an action selected from a group consisting of:
      i) offering a percent discount to the subset of potential action targets associated with that action;
      ii) offering a cash back coupon to the subset of potential action targets associated with that action;
      iii) offering a buy one get one free opportunity to the subset of potential action targets associated with that action; and
      iv) sending a communication comprising creative content selected by the user of the graphical user interface to the subset of potential action targets associated with that action.

6. The method of claim 1, wherein the method comprises:
a) providing, in the graphical user interface, one or more global filtering tools operable by the user of the graphical user interface to define characteristics of an underlying population; and
b) defining the potential action targets by filtering an audience database to only include audience members having characteristics defined by the user of the graphical user interface using the one or more global filtering tools.

7. The method of claim 6, wherein the graph view portion of the graphical user interface illustrates potential action targets as a normalized curve based on data retrieved from the database using the characteristics defined by the one or more global filtering tools.

8. The method of claim 7, wherein the method comprises defining a segment border as a curve within a configured proximity of the normalized curve.

9. The method of claim 8, wherein the segment border defined as a curve within a configured proximity of the normalized curve is separate, and is displayed in the graph view portion separately from, the normalized curve.

10. The method of claim 1, wherein the method comprises:
a) in response to selection of a first analytic component, creating a first layer in which potential action targets are illustrated on a graph with axes defined based on the first analytic component;
b) in response to selection of a second analytic component, creating a second layer in which potential action targets are illustrated on a graph with axes defined based on the second analytic component; and
c) combining the first and second layers to illustrate potential action targets on a graph with axes defined based on both the first analytic component and the second analytic component.

11. The method of claim 1, wherein:
a) each of the selected one or more analytic components by which the axes are defined is a characteristic of the potential action targets; and
b) the set of segment definition tools operable by the user of the graphical user interface to define the set of segment borders comprises one or more segment definition tools operable by the user to directly manipulate the set of segment borders on the graph.

12. A system for generating computer readable data defining actions to be performed for corresponding targets using a graphical user interface, the system comprising a processor configured to perform acts comprising:
a) dynamically updating a graph view portion of a graphical user interface based on selection of one or more analytic components, wherein the graph view portion illustrates potential action targets on a graph with axes defined by the selected one or more analytic components;
b) providing, in the graphical user interface, one or more segment definition tools operable by a user of the graphical user interface to define a set of segment borders, and illustrating the set of segment borders on the graph with axes defined by the selected one or more analytic components;
c) providing, in the graphical user interface, one or more global filtering tools operable by the user of the graphical user interface to define characteristics of an underlying population;
d) defining the potential action targets by filtering an audience database to only include audience members having characteristics defined by the user of the graphical user interface using the one or more global filtering tools;
e) providing, in the graphical user interface, one or more action tools operable by the user of the graphical user interface to define and associate actions with subsets of the potential action targets illustrated in regions defined by the set of segment borders on the graph with axes defined by the selected one or more analytic components; and
f) automatically generating the computer readable data defining actions to be performed for corresponding targets by encoding data comprising:
 i) a universe of potential action targets;
 ii) the one or more selected analytic components;
 iii) one or more target segments encoded using the set of segment borders in analytic space defined by the one or more selected analytic components; and
 iv) one or more actions, each of the one or more actions having been defined by the one or more action tools and corresponding to a target segment from the one or more target segments;
wherein:
A) the graph view portion of the graphical user interface illustrates potential action targets as a normalized curve based on data retrieved from the database using the characteristics defined by the one or more global filtering tools; and
B) the one or more segment definition tools are operable by the user of the graphical user interface to define a segment border as a curve within a configured proximity of the normalized curve.

13. The system of claim 12, wherein the set of acts the processor is configured to perform comprises:
a) associating each of the one or more actions with a subset of the potential action targets;
b) for each of the one or more actions, forecasting an expected result of applying that action to the associated subset of the potential action targets; and
c) providing, in the graphical user interface, a simulation result tool operable by the user of the graphical user interface to view, for each of the one or more actions, the expected result forecasted for that action.

14. The system of claim 13, wherein the processor is configured with instructions operable to, for at least one action from the one or more actions:
a) when an expected result for an action from the one or more actions is negative when accounting for cost of that action; and
b) based on determining that the expected result is negative, updating the graph view portion of the graphical user interface to visually distinguish the region defined by the set of segment borders corresponding to the subset of potential action targets associated with that action.

15. The system of claim 13, wherein:
a) the processor is configured to provide, in the graphical user interface, one or more model definition tools operable by the user of the graphical user interface to specify forecasting parameters for a corresponding action; and
b) the processor is configured to forecast the expected result based on parameters specified by the user of the graphical user interface.

16. The system of claim 12, wherein:
a) the acts the processor is configured to perform comprise providing, in the graphical user interface, an analytic component selection operable by the user of the graphical user interface to select from analytic components comprising:
  i) recency of purchase;
  ii) brand engagement;
  iii) category engagement; and
  iv) number of purchases;
b) the one or more actions comprise an action selected from a group consisting of:
  i) offering a percent discount to the subset of potential action targets associated with that action;
  ii) offering a cash back coupon to the subset of potential action targets associated with that action;
  iii) offering a buy one get one free opportunity to the subset of potential action targets associated with that action; and
  iv) sending a communication comprising creative content selected by the user of the graphical user interface to the subset of potential action targets associated with that action.

17. The system of claim 12, wherein the acts the processor is configured to perform comprise:
  a) identifying an unassigned subset of the potential action targets as not associated with an action; and
  b) based on identifying the unassigned subset of potential action targets, updating the graph view portion of the graphical user interface to visually distinguish the region defined by the set of segment borders corresponding to the unassigned subset of potential action targets.

18. The system of claim 12, wherein the processor is configured with instructions operable to:
  a) in response to selection of a first analytic component, create a first layer in which potential action targets are illustrated on a graph with axes defined based on the first analytic component;
  b) in response to selection of a second analytic component, create a second layer in which potential action targets are illustrated on a graph with axes defined based on the second analytic component; and
  c) combine the first and second layers to illustrate potential action targets on a graph with axes defined based on both the first analytic component and the second analytic component.

19. The system of claim 12, wherein:
  a) each of the selected one or more analytic components by which the axes are defined is a characteristic of the potential action targets; and
  b) the set of segment definition tools operable by the user of the graphical user interface to define the set of segment borders comprises one or more segment definition tools operable by the user to directly manipulate the set of segment borders on the graph.

20. The system of claim 12, wherein the segment border defined as a curve within a configured proximity of the normalized curve is separate, and is displayed in the graph view portion separately from, the normalized curve.

* * * * *